US011367964B2

(12) United States Patent
Hollenbeck et al.

(10) Patent No.: US 11,367,964 B2
(45) Date of Patent: Jun. 21, 2022

(54) DUAL-BAND INTEGRATED PRINTED ANTENNA FEED

(71) Applicant: Optisys, LLC, West Jordan, UT (US)

(72) Inventors: Michael C. Hollenbeck, West Jordan, UT (US); Robert Smith, West Jordan, UT (US)

(73) Assignee: Optisys, LLC, West Jordan, UT (US)

( * ) Notice: Subject to any disclaimer, the term of this patent is extended or adjusted under 35 U.S.C. 154(b) by 100 days.

(21) Appl. No.: 16/237,720

(22) Filed: Jan. 1, 2019

(65) Prior Publication Data

US 2019/0207321 A1 Jul. 4, 2019

Related U.S. Application Data

(60) Provisional application No. 62/612,832, filed on Jan. 2, 2018.

(51) Int. Cl.

| | |
|---|---|
| ***H01Q 19/19*** | (2006.01) |
| ***H01Q 13/02*** | (2006.01) |
| ***H01Q 5/30*** | (2015.01) |
| ***H01Q 5/47*** | (2015.01) |
| *H01P 3/06* | (2006.01) |

(Continued)

(52) U.S. Cl.

CPC ............. *H01Q 19/193* (2013.01); *H01Q 5/30* (2015.01); *H01Q 5/47* (2015.01); *H01Q 13/02* (2013.01); *H01Q 13/0258* (2013.01); *H01P 1/182* (2013.01); *H01P 3/06* (2013.01); *H01Q 19/023* (2013.01)

(58) Field of Classification Search

CPC ........ H01Q 19/193; H01Q 5/30; H01Q 13/02; H01Q 5/47; H01Q 13/0258; H01Q 19/023; H01P 3/06; H01P 1/182

See application file for complete search history.

(56) References Cited

U.S. PATENT DOCUMENTS 2,582,162 A 2/1952 Sensiper et al.
5,859,619 A * 1/1999 Wu ...................... H01Q 19/192 343/781 CA (Continued)

FOREIGN PATENT DOCUMENTS

CN 103961946 A 4/2014
DE 4002522 A1 8/1991

(Continued)

OTHER PUBLICATIONS

F.I. Sheftman, "Experimental Study of Subreflector Support Structures in a Cassegrainian Antenna", Technical Report 416, Sep. 23, 1966, Lincoln Laboratory, Massachusetts Institute of Technology, Lexington, MA.

*Primary Examiner* — Graham P Smith
*Assistant Examiner* — Jae K Kim
(74) *Attorney, Agent, or Firm* — Paul C. Oestreich; Eminent IP, P.C.

(57) ABSTRACT

The invention includes various embodiments of integrated dual-band printed antenna feeds having various combinations of electrical and structural components for use with a prime focus, ring focus, or Cassegrain dish antennas. All of the embodiments of dual-band antenna feeds disclosed herein are configured to be fabricated as a single structure using metal additive manufacturing techniques.

12 Claims, 25 Drawing Sheets

(51) Int. Cl.
*H01P 1/18* (2006.01)
*H01Q 19/02* (2006.01)

(56) References Cited

U.S. PATENT DOCUMENTS

| | | | | |
|---|---|---|---|---|
| 6,911,953 | B2 * | 6/2005 | Gothard | H01Q 5/47 343/781 CA |
| 6,937,201 | B2 * | 8/2005 | Gothard | H01Q 5/47 343/781 CA |
| 7,187,340 | B2 * | 3/2007 | Kralovec | H01Q 19/19 343/781 CA |
| 9,318,810 | B2 | 4/2016 | Zelenski | |
| 9,742,069 | B1 * | 8/2017 | Hollenbeck | H01Q 13/0208 |
| 10,418,712 | B1 * | 9/2019 | Henderson | H01Q 19/134 |
| 10,826,165 | B1 * | 11/2020 | Deju | H05K 5/069 |
| 2011/0291903 | A1 * | 12/2011 | Shea | H01Q 13/065 343/779 |
| 2011/0304508 | A1 * | 12/2011 | Remez | G01S 3/48 342/442 |
| 2013/0314172 | A1 | 11/2013 | Massman | |
| 2015/0091769 | A1 * | 4/2015 | Zelenski | H01Q 13/0208 343/781 CA |
| 2015/0097747 | A1 * | 4/2015 | Hwang | H01Q 5/47 343/785 |
| 2017/0062895 | A1 * | 3/2017 | Zhu | H01P 11/002 |
| 2017/0222320 | A1 * | 8/2017 | Cousin | H01Q 5/55 |
| 2018/0175510 | A1 * | 6/2018 | Tuau | H01Q 19/193 |
| 2018/0323514 | A1 * | 11/2018 | Pance | H01Q 21/061 |
| 2019/0013587 | A1 * | 1/2019 | Gendron | H01P 1/172 |
| 2019/0020112 | A1 * | 1/2019 | Luo | H01Q 13/06 |

FOREIGN PATENT DOCUMENTS

| | | | | |
|---|---|---|---|---|
| WO | WO2017/049367 | * | 3/2017 | H01Q 13/00 |
| WO | WO-2017049367 A1 | * | 3/2017 | H01P 1/022 |

* cited by examiner

DUAL-BAND INTEGRATED PRINTED ANTENNA FEED

CROSS-REFERENCE TO RELATED APPLICATIONS

This US non-provisional patent application claims benefit and priority to U.S. provisional patent application Ser. No. 62/612,832 filed on Jan. 2, 2018, titled "DUAL-BAND INTEGRATED PRINTED ANTENNA FEED", the contents of which are incorporated by reference as if fully set forth herein and for all purposes.

This U.S. non-provisional patent application is related to U.S. continuation-in-part patent application Ser. No. 15,968,463, filed on May 1, 2018, issued as U.S. Pat. No. 10,468,773, which in turn claims benefit and priority to U.S. continuation patent application Ser. No. 15/679,137, filed on Aug. 16, 2017, titled: "INTEGRATED SINGLE-PIECE ANTENNA FEED AND CIRCULAR POLARIZER", issued as U.S. Pat. No. 9,960,495 on May 1, 2018, which in turn claims benefit and priority to U.S. non-provisional patent application Ser. No. 15/445,866, filed on Feb. 28, 2017, titled "INTEGRATED SINGLE-PIECE ANTENNA FEED", issued as U.S. Pat. No. 9,742,069 on Aug. 22, 2017, which in turn claims benefit and priority to U.S. provisional patent application No. 62/409,277 filed on Oct. 17, 2016, titled "INTEGRATED SINGLE-PIECE ANTENNA FEED". This U.S. non-provisional patent application is also related to U.S. non-provisional patent application Ser. No. 16/248,285, filed on Jan. 15, 2019, titled: "BUILD ORIENTATION FOR ADDICTIVE MANUFACTURING OF COMPLEX STRUCTURES" pending, which in turn claims benefit and priority to U.S. provisional patent application No. 62/617,462, filed on Jan. 15, 2018, tilted "BUILD ORIENTATION FOR ADDITIVE MANUFACTURING OF COMPLEX STRUCTURES". The contents of all of the above related patent applications and issued patents are incorporated by reference as if fully set forth herein and for all purposes.

BACKGROUND OF THE INVENTION

Field of the Invention

The present invention relates generally to antennas and feeds for dish antennas. In particular, this invention relates to prime focus, ring focus, or Cassegrain dish antennas for use in communications systems. Still more particularly, this invention relates to an integrated dual-band antenna feed for use with a prime focus, ring focus, or Cassegrain dish antenna.

Description of Related Art

High gain antennas, used in applications such as satellite communications (SATCOM), or long range line-of-sight (LOS) communications links, require large aperture areas to achieve sufficiently high gains. Two primary methods by which these large aperture areas can be achieved are through an array of small elements (array antenna) or through directing the RF energy to an antenna feed using a large area dish and a subreflector. The reflector may also focus directly to an antenna feed (prime focus antenna) instead of using a subreflector. The reflector can be fabricated in a plurality of ways to achieve the optics desired. Additionally, a large lens can be used to focus energy to an antenna feed.

In parabolic antennas such as satellite dishes, an antenna feed horn (or simply, feedhorn) is a small horn antenna used to direct radio waves between a feedhorn, a subreflector, and a parabolic main reflector dish. The antenna can be transmit only, receive only (half duplex), or it can have both transmit and receive functionality, simultaneously (full duplex). In transmit mode, the feed horn is connected to the transmitter and converts the radio frequency energy from the transmitter to radio waves and feeds them to the rest of the antenna, which focuses them into a beam. In receiving mode, incoming radio waves are gathered and focused by the antenna's main reflector onto the feed horn with an optional a subreflector, which converts the incoming radio waves into detectable radio frequency energy which may be amplified and further processed by the receiver. Transmission mode and receiving mode can occur simultaneously from the same antenna either through frequency division or through time division duplexing. Alternatively, transmission and receiving modes can occur individually.

One problem with a conventional antenna feed is that each of the components, e.g., input section, polarizer, feed horn and subreflector, etc., is generally constructed as a separate component. The assembly, testing and fine tuning of such separately manufactured antenna feeds results in significant labor and manufacturing cost, long fabrication and test times, and potential for high variability of antenna performance between units. Further, traditional antenna feeds require a large volume and multiple separate components to support dual-band operation. Dual-band operation is attractive in that it allows for a single antenna to support two separate frequency bands. This can provide additional capability in an antenna and reduce the total number of antennas required on a platform.

Accordingly, there exists a need in the art for an antenna feed that may be formed of a single structure that includes various combinations of components for various given applications, especially in supporting two separate frequency bands from the antenna feed structure. Such embodiments of an antenna feed would ideally obviate the need to assemble, test and fine tune individual antenna components as in conventional antenna feeds.

BRIEF SUMMARY OF THE INVENTION

Embodiments of the invention include various dual-band integrated printed antenna feeds, for use with a prime focus, ring focus, or Cassegrain dish antenna and in SATCOM applications among others.

An embodiment of a dual-band antenna feed having an axis is disclosed. The embodiment of an antenna feed may include a lower frequency coaxial input, a lower frequency input coaxial turnstile in communication with the lower frequency coaxial input and a lower frequency outer coaxial turnstile in communication with the lower frequency input coaxial turnstile. The embodiment of an antenna feed may further include a lower frequency outer coaxial horn, a higher frequency circular input located within the lower frequency coaxial input and a higher frequency circular horn in communication with the higher frequency circular input and located within the lower frequency outer coaxial horn.

Another embodiment of a dual-band antenna feed having an axis is disclosed. The embodiment of a dual-band antenna feed may include a lower frequency coaxial input, a lower frequency input coaxial turnstile in communication with the lower frequency coaxial input and a lower frequency outer coaxial turnstile in communication with the lower frequency input coaxial turnstile. The embodiment of a dual-band antenna feed may further include a lower frequency outer coaxial horn, a higher frequency circular input located within the lower frequency coaxial input and a higher frequency coaxial horn in communication with the higher frequency circular input and located within the lower frequency outer coaxial horn.

Additional features and advantages of the invention will be apparent from the detailed description which follows, taken in conjunction with the accompanying drawings, which together illustrate, by way of example, features of embodiments of the present invention.

BRIEF DESCRIPTION OF THE SEVERAL VIEWS OF THE DRAWINGS

The following drawings illustrate exemplary embodiments for carrying out the invention. Like reference numerals refer to like parts in different views or embodiments of the present invention in the drawings.

DETAILED DESCRIPTION OF THE INVENTION

Figure 1:
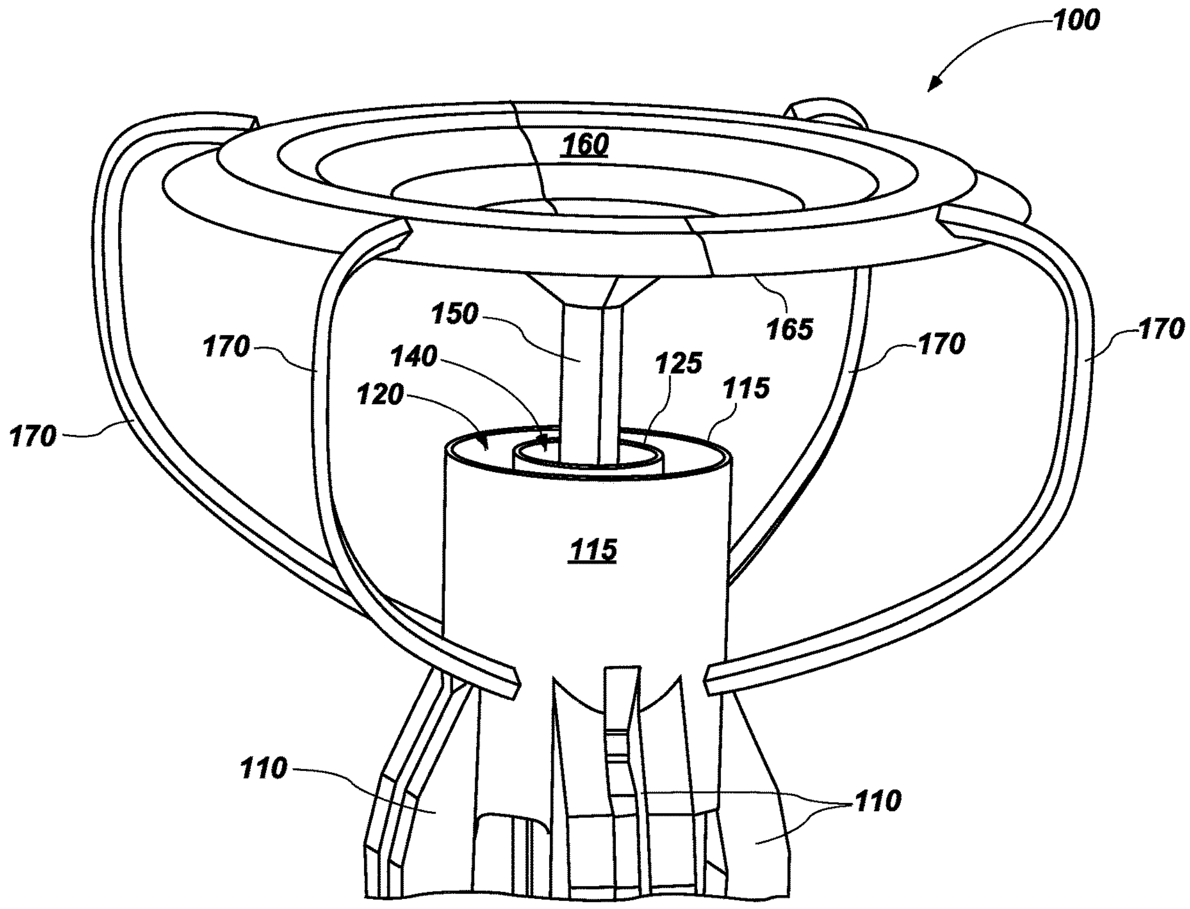
FIG. 1 is a partial perspective view of a first embodiment of a dual-band integrated printed antenna (DIPA), according to the present invention.

Embodiments of the present invention include dual-band integrated printed antenna feeds for use with a prime focus, ring focus, or Cassegrain dish antenna. The various embodiments of a dual-band integrated antenna feed disclosed herein may include some or all of the following components: a lower frequency coaxial input, a lower frequency input coaxial turnstile, lower frequency polarizer phase shifting arms, a lower frequency outer coaxial turnstile, a lower frequency outer coaxial horn, a higher frequency circular waveguide input, a higher frequency input circular waveguide turnstile, higher frequency polarizer phase shifting arms, a higher frequency inner coaxial turnstile (embedded within the lower frequency outer coaxial turnstile and polarizer arms), a higher frequency inner coaxial horn, a higher frequency inner circular horn, a coaxial subreflector support, a subreflector, and a plurality of strut subreflector supports.

The terms "input" and "output", as used herein, suggest starting and ending locations, respectively, for directed electromagnetic wave energy. However, it will be understood that the embodiments of antennas disclosed herein are generally bidirectional. So, an electromagnetic wave, or communications signal, may travel in either direction depending on whether the antenna is receiving or sending electromagnetic energy signals.

The term "turnstile" as used herein is a transitional waveguide that branches out from a coaxial or circular waveguide into a plurality of arms, typically four arms. Each of the arms serves as a waveguide for a portion of an electromagnetic wave that may or may not undergo further signal processing, for example and not by way of limitation, linear or circular polarization, etc. Multiple turnstiles may be used for a given embodiment of an antenna feed. For example, input and output turnstiles may be used in between polarizer arms located between the branches of the turnstiles. An electromagnetic wave may travel in either direction through a turnstile.

The term "circular", as used herein and applied to a waveguide input, or a waveguide horn, is a circular cross-sectioned opening inside of a cylindrical member that has no other structural elements within the immediate opening. The term "coaxial", as used herein and applied to a waveguide input, or a waveguide horn, is generally a washer-shaped cross-sectioned opening inside of a cylindrical member that has another structural element within the immediate opening. It will be understood that "another structural element" may be another cylindrical member with smaller radius, such as a coaxial subreflector support. Reference will now be made to particular embodiments of dual-band integrated printed antenna feeds as illustrated in the drawings.

FIG. 1 is a partial perspective view of a first embodiment of a dual-band integrated printed antenna (DIPA) 100, according to the present invention. DIPA 100 may include a lower frequency coaxial turnstile 110 transitioning to an outer coaxial cylinder 115. DIPA 100 may further include an inner coaxial cylinder 125. DIPA 100 may further include a lower frequency outer coaxial horn 120 located in between the inner 125 and outer 115 coaxial cylinders. DIPA 100 may further include a higher frequency inner coaxial turnstile 130 (not shown in FIG. 1, but located inside lower frequency coaxial turnstile 110). DIPA 100 may further include a higher frequency inner coaxial horn 140 surrounding a coaxial subreflector support 150. The coaxial subreflector support 150 physically supports subreflector 160. Subreflector 160 may also be physically supported by strut subreflector supports 170. Although four strut subreflector supports 170 are shown in FIG. 1, it will be understood that any suitable number, e.g., one to six, of strut subreflector supports 170 may be employed to support subreflector 160, according to other embodiments. Because strut subreflector supports 170 partially obstruct the path of electromagnetic wave propagation, fewer strut subreflector supports 170 are generally preferred.

Figure 2:
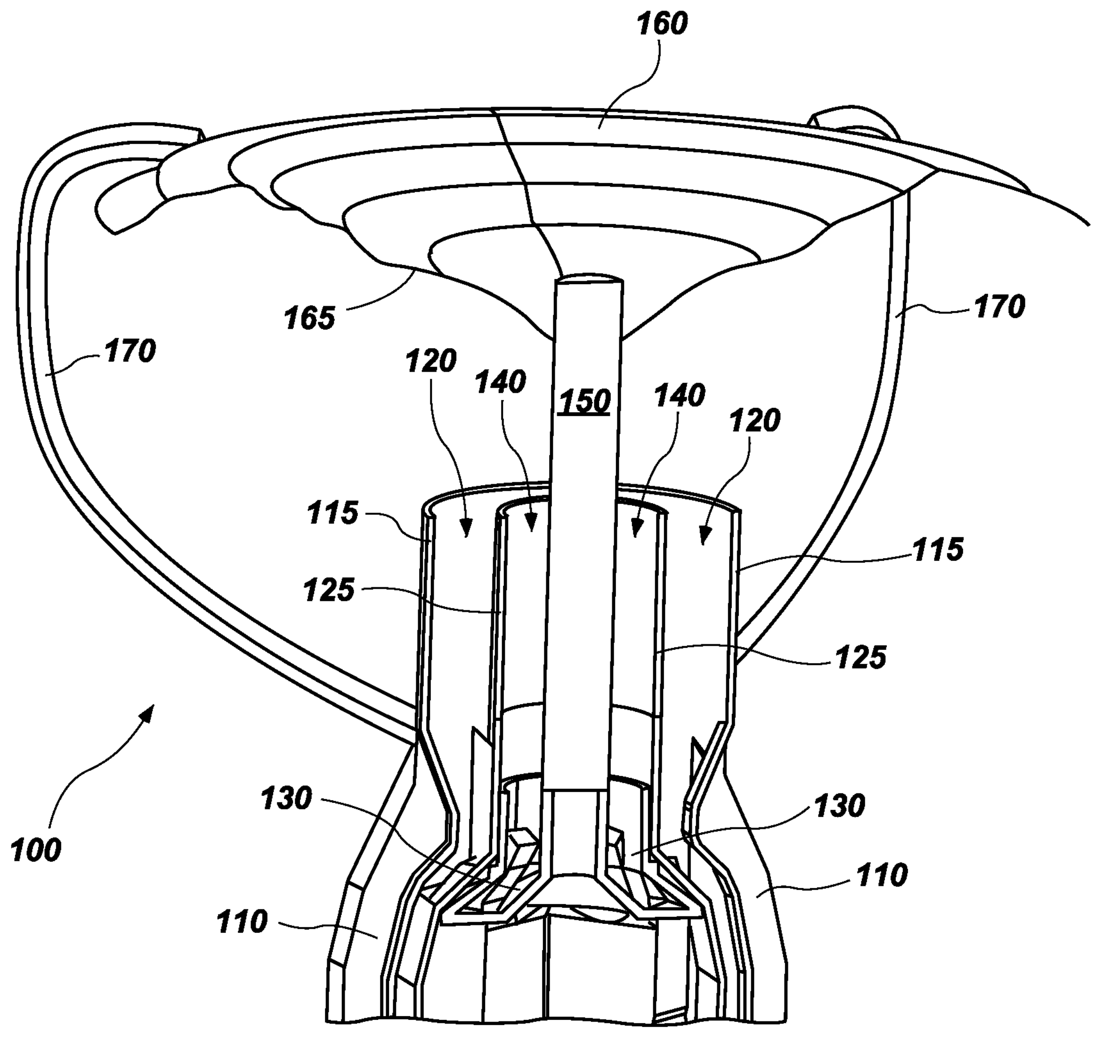
FIG. 2 is a partial cross-sectional view of the embodiment of a DIPA shown in FIG. 1.

FIG. 2 is a partial cross-sectional view of the DIPA 100 shown in FIG. 1, according to the present invention. As shown in FIG. 2, DIPA 100 may include a lower frequency coaxial turnstile 110 surrounding a higher frequency inner coaxial turnstile 130. The first embodiment of DIPA 100 may further include a lower frequency outer coaxial horn 120, surrounding a higher frequency inner coaxial horn 140, which in turn surrounds coaxial subreflector support 150. The lower frequency outer coaxial horn 120 may be disposed between inner 125 and outer coaxial cylinders 115. Higher frequency inner coaxial horn 140 may be disposed between coaxial subreflector support 150 and inner coaxial cylinder 125. Subreflector 160 may be physically supported by the coaxial subreflector support 150 and a plurality of strut subreflector supports 170 (two shown in the cross-sectional view of FIG. 2).

In operation, a lower frequency electromagnetic wave may emanate from the lower frequency outer coaxial horn 120 and be reflected off of the bottom surface 165 of subreflector 160 to illuminate a main reflector (not shown and of larger diameter) which bounces the wave a toward its intended location, typically another antenna (not shown) located some distance away, e.g., from satellite to earth or vice versa. Alternatively, as noted above, a lower frequency electromagnetic wave may travel in the opposite direction, first reflecting off of the bottom surface 165 of subreflector 160 and then enter into the lower frequency outer coaxial horn 120 for further signal processing.

The operation of the DIPA 100 for a higher frequency electromagnetic wave is analogous with regard to the higher frequency inner coaxial horn 140. For example, a higher frequency electromagnetic wave may emanate from the higher frequency inner coaxial horn 140 and be reflected off of the bottom surface of subreflector 160. Alternatively, a higher frequency electromagnetic wave may travel in the opposite direction, first reflecting off of the bottom surface 165 of subreflector 160 and then entering into the higher frequency inner coaxial horn 140 for further signal processing.

Figure 3:
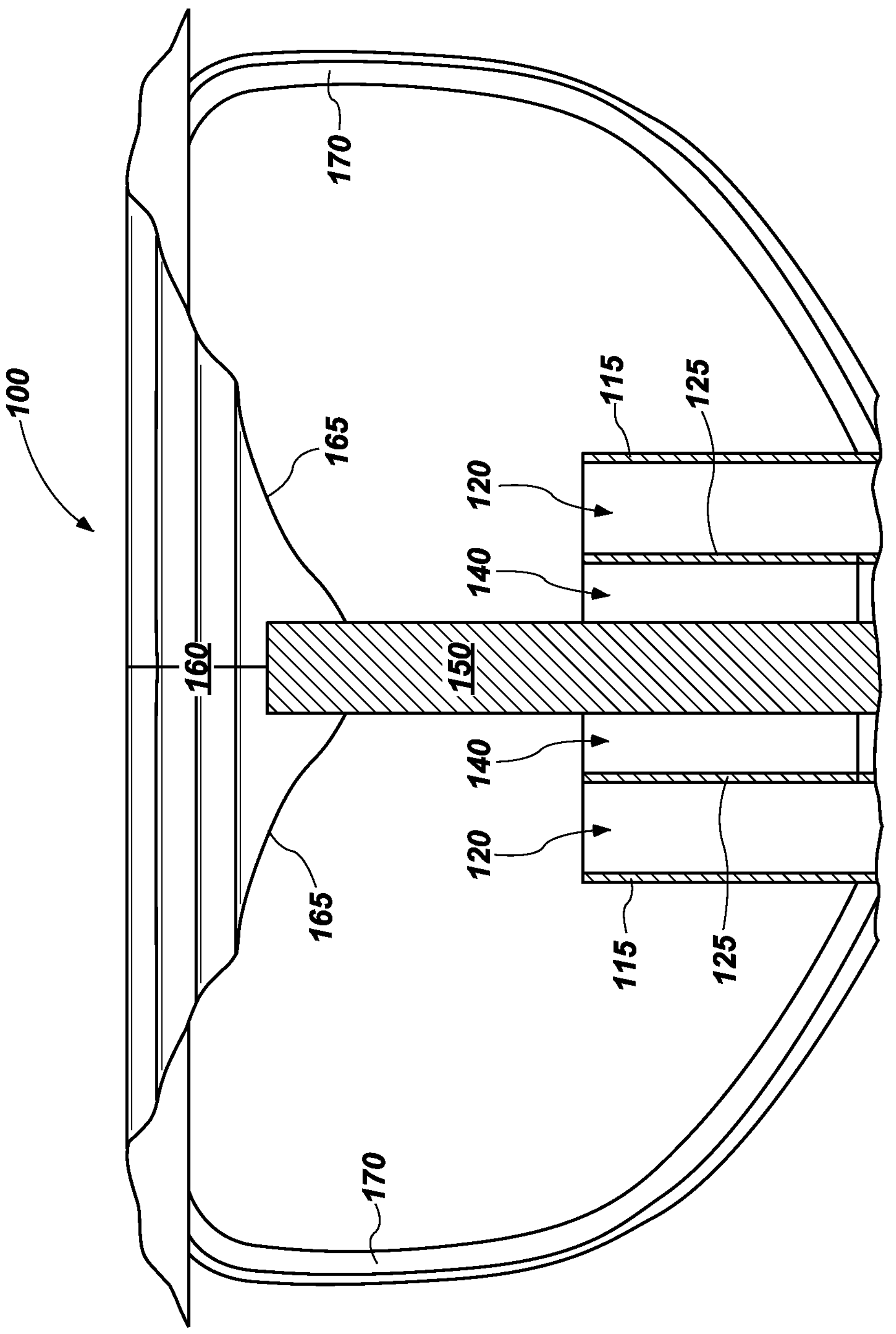
FIG. 3 is a partial side cross-sectional view of the embodiment of a DIPA shown in FIGS. 1-2.

FIG. 3 is an expanded partial side cross-sectional view of the DIPA 100 shown in FIGS. 1-2, according to the present invention. The first embodiment DIPA 100 shown in FIG. 3 may include inner 125 and outer 115 coaxial cylinders defining a lower frequency outer coaxial horn 120. The first embodiment DIPA 100 shown in FIG. 3 may include a higher frequency inner coaxial horn 140 disposed between the coaxial subreflector support 150 and the inner coaxial cylinder 125. Subreflector 160 may be physically supported by coaxial subreflector support 150 and a plurality of strut subreflector supports 170 (only two shown in the cross-section of FIG. 3). The partial view shown in FIG. 3 does not illustrate the lower frequency outer 110 and higher frequency inner 130 turnstiles which may be located below the horns 120 and 140.

Figure 4:
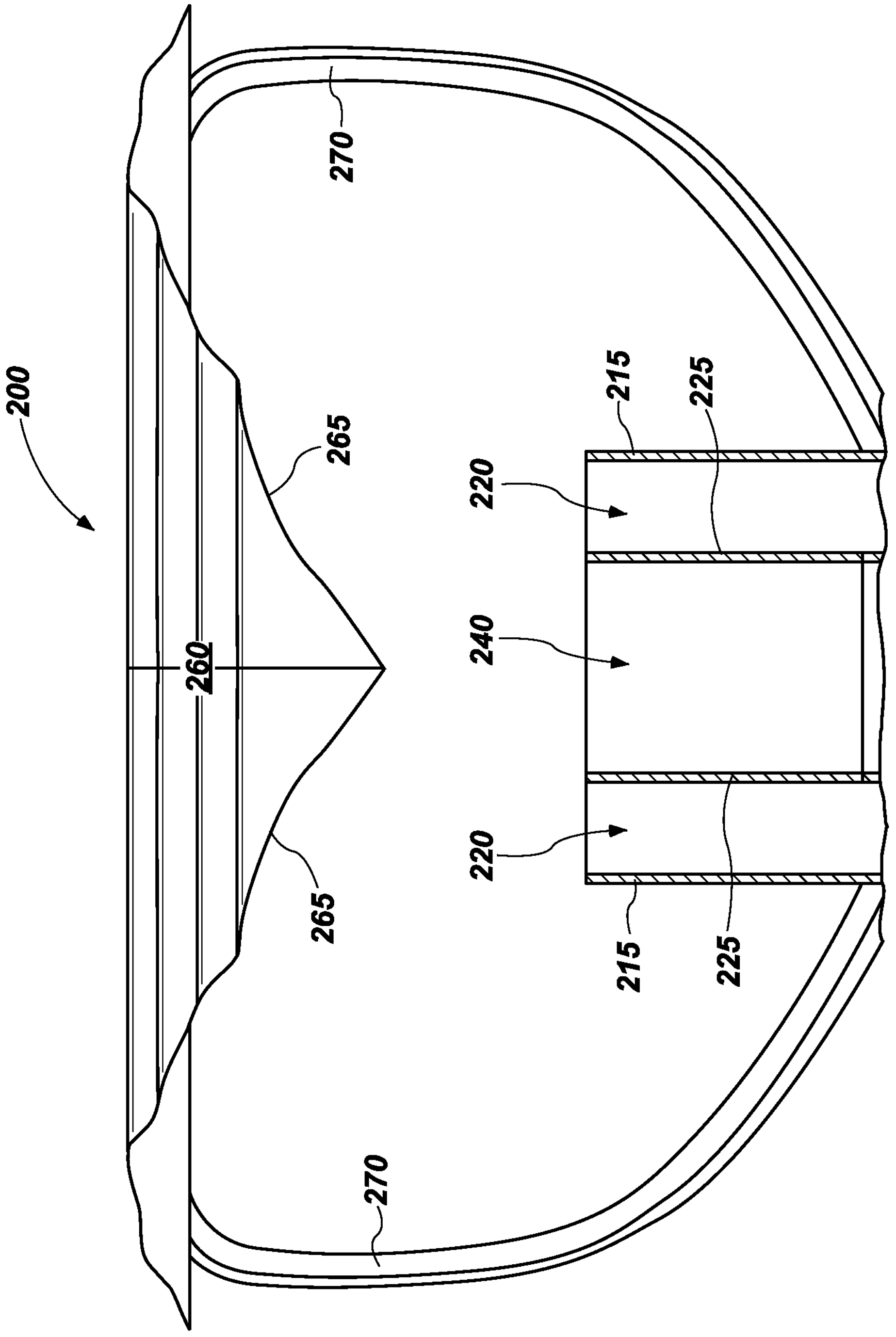
FIG. 4 is a partial side cross-sectional view of a second embodiment of a DIPA, according to the present invention.

FIG. 4 is a partial side cross-sectional view of another embodiment of a DIPA 200, according to the present invention. This embodiment of a DIPA 200 removes the coaxial subreflector support 150 of the embodiment of DIPA 100. More particularly this second embodiment of DIPA 200 shown in FIG. 4 may include an inner coaxial cylinder 225 and outer coaxial cylinder 215 which define a lower frequency outer coaxial horn 220. The second embodiment of DIPA 200 shown in FIG. 4 may include a higher frequency inner circular waveguide horn 240 disposed inside the inner coaxial cylinder 225. The second embodiment of DIPA 200 shown in FIG. 4 may include subreflector 260, and strut subreflector supports 270 (two of four shown) which provide physical support to the subreflector 260 in the absence of a coaxial subreflector support 150 like that shown in the first embodiment of a DIPA 100 (see, e.g., FIGS. 1-3 and related discussion above).

Although only two strut subreflector supports 270 are shown in FIG. 4, it will be understood that any suitable number, e.g., one to six, of evenly dispersed strut subreflector supports 270 may be employed to support subreflector 260, according to other embodiments of a DIPA 200. It will be further understood that strut subreflector supports 270 partially obstruct the path of electromagnetic wave propagation. Accordingly, fewer strut subreflector supports 270 are generally preferred.

By removing the coaxial subreflector support 150 shown in the embodiment of a DIPA 100 (FIGS. 1-3), DIPA 200 provides a circular waveguide horn 240 for the higher frequency band, rather than the coaxial waveguide horn 120 of the first embodiment of a DIPA 100. During transmission, high or low frequency electromagnetic signals may emanate from horns 240 and 220, respectively and then bounce off the bottom surface 265 of subreflector 260 to illuminate a main reflector (not shown and of larger diameter) which bounces the wave a toward its intended location, typically another antenna (not shown) located some distance away, e.g., from satellite to earth or vice versa. It will be understood that when operating as a receiver, higher or lower frequency signals transmitted from a distant antenna (not shown) will bounce off the bottom surface 265 of the subreflector 260 and enter into the high 240 or low 220 frequency horns for further signal processing through further antenna components (not shown).

Figure 5:
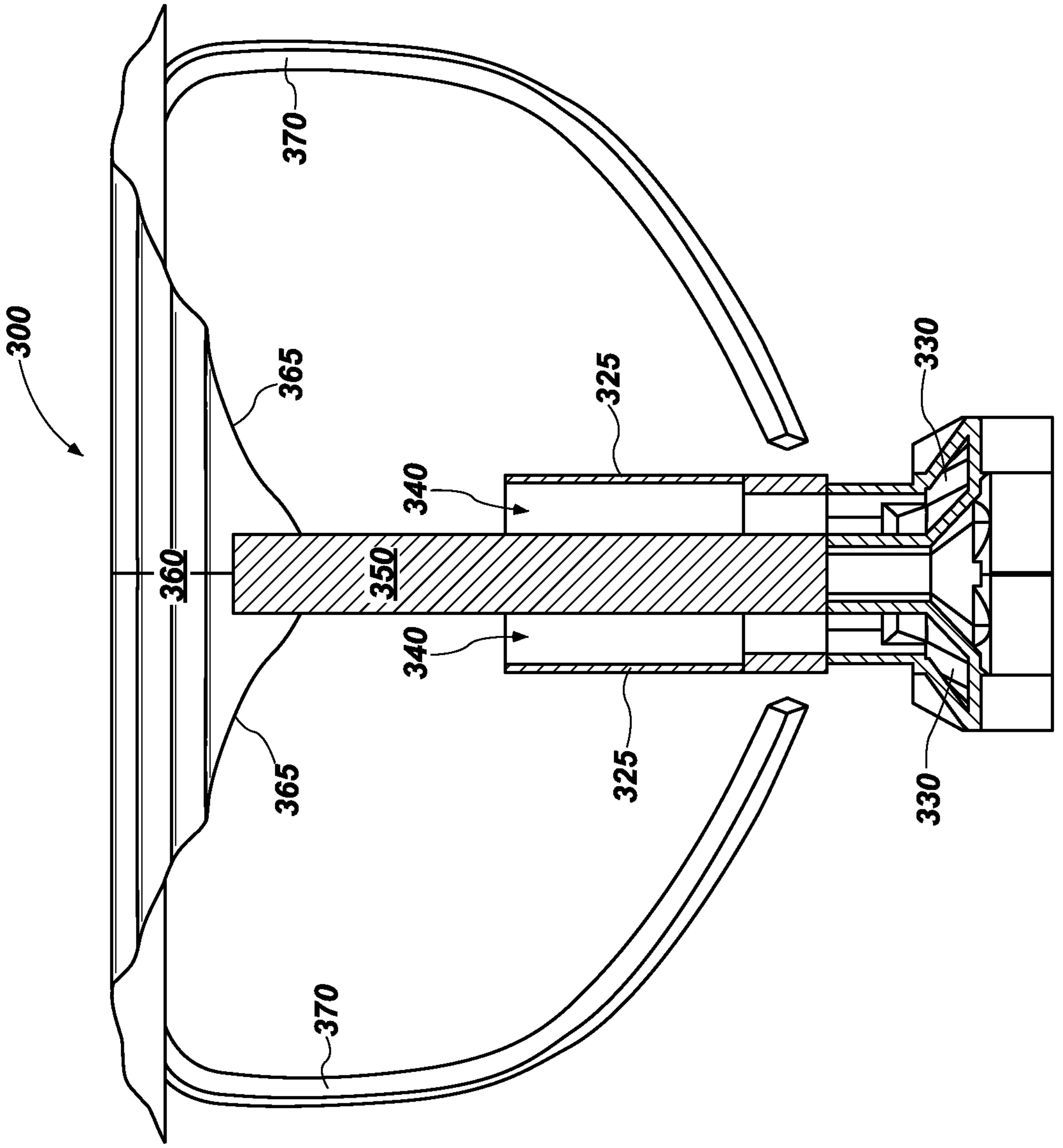
FIG. 5 is a partial side cross-sectional view of a third embodiment of a DIPA, according to the present invention.

FIG. 5 is a partial side cross-sectional view of a third embodiment of a DIPA 300, according to the present invention. The third embodiment of a DIPA 300 shown in FIG. 5 illustrates only the structural components necessary for the higher frequency band operation. More particularly, the third embodiment of a DIPA 300 as shown in FIG. 5 may include a higher frequency coaxial horn 340 disposed between coaxial cylinder 325 and coaxial subreflector support 350. The higher frequency coaxial horn 340 is in communication with a higher frequency coaxial turnstile 330. The third embodiment of a DIPA 300 as shown in FIG. 5 may further include a subreflector 360 physically supported by strut subreflector supports 370. In this third embodiment of a DIPA 300, subreflector 360 is physically supported by the coaxial subreflector support 350 and also the strut subreflector supports 370.

In operation, a higher frequency electromagnetic wave, or signal, may emanate from the higher frequency coaxial horn 340 and be reflected off of the bottom surface 365 of subreflector 360 to illuminate a main reflector (not shown) of larger diameter which bounces the wave a toward its intended location, typically another antenna (not shown) located some distance away, e.g., from satellite to earth or vice versa. Alternatively as noted above, a higher frequency electromagnetic wave may travel in the opposite direction, first reflecting off of the bottom surface 365 of subreflector 360 before entering into the higher frequency coaxial horn 340 for further signal processing.

The cross-sectional view of DIPA 300 shown in FIG. 5 does not illustrate the lower connections of the two strut subreflector supports 370 as they would be attached to coaxial cylinder 325. Furthermore, because of the cross-sectional view of DIPA 300, only two strut subreflector supports 370 are shown in FIG. 5. However, it will be understood that any suitable number, e.g., 3-6, of evenly dispersed strut subreflector supports 370 may be employed to support subreflector 360, according to other embodiments of the present invention. It will be further understood that strut subreflector supports 370 partially obstruct the path of electromagnetic wave propagation. Accordingly, fewer strut subreflector supports 370 are generally preferred.

Figure 6:
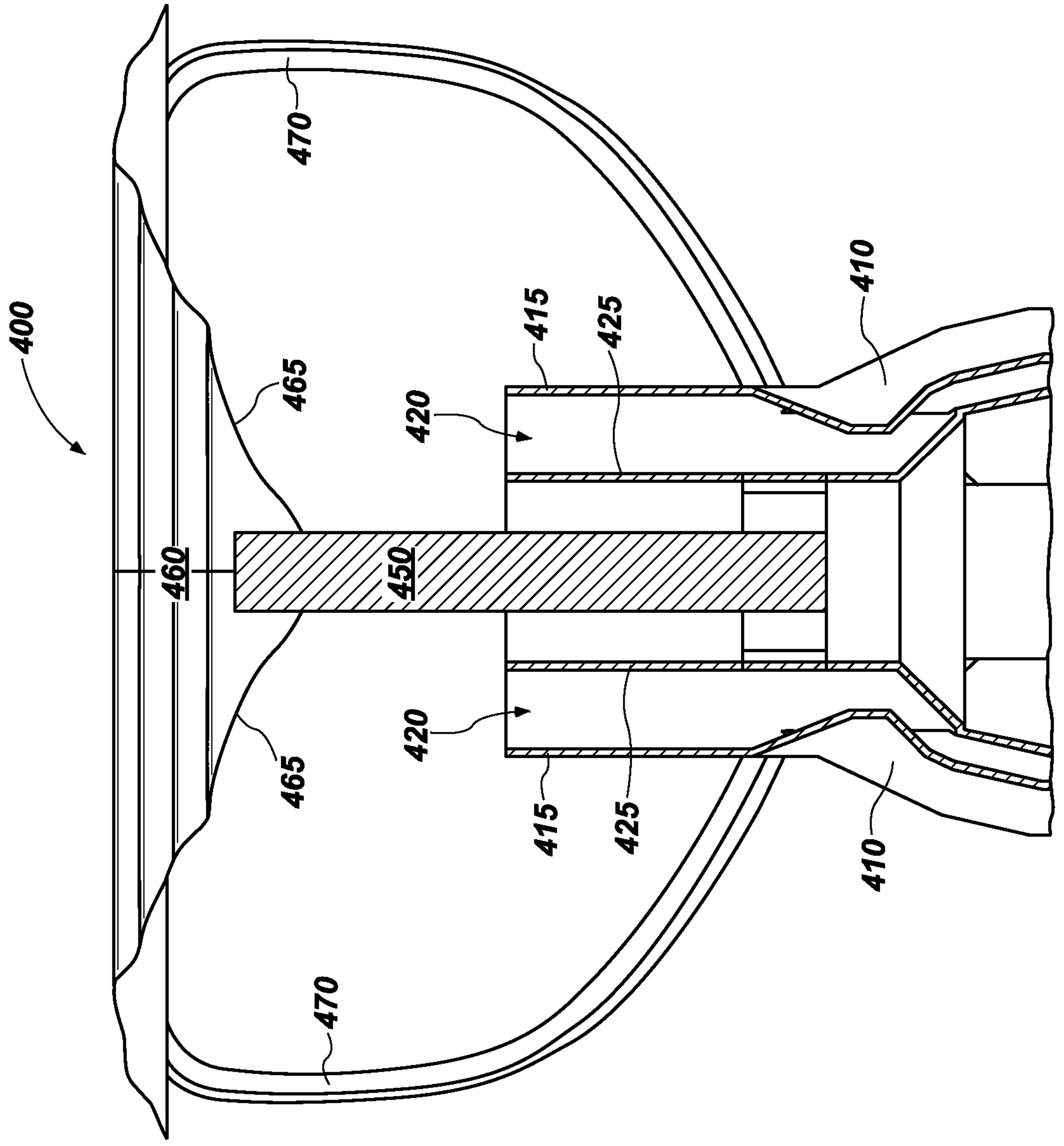
FIG. 6 is a partial side cross-sectional view of a fourth embodiment of a DIPA, according to the present invention.

FIG. 6 is a partial side cross-sectional view of a fourth embodiment of a DIPA 400, according to the present invention. The fourth embodiment of a DIPA 400 shown in FIG. 6 illustrates only the components necessary for the lower frequency band of operation. More particularly the fourth embodiment of a DIPA 400 illustrated in FIG. 6 may include a lower frequency outer coaxial turnstile 410 (shown in part at bottom of FIG. 6) feeding a lower frequency outer coaxial horn 420. The lower frequency outer coaxial horn 420 is disposed between an inner coaxial cylinder 425 and an outer coaxial cylinder 415. The fourth embodiment of a DIPA 400 illustrated in FIG. 6 may further include a coaxial subreflector support 450 and strut subreflector supports 470 (two shown in FIG. 6), which physically support a subreflector 460.

Because of the cross-sectional view of DIPA 400, only two strut subreflector supports 470 are shown in FIG. 6. However, it will be understood that any suitable number, e.g., 3-6, of evenly dispersed strut subreflector supports 470 may be employed to support subreflector 460, according to other embodiments of the invention. It will be further understood that strut subreflector supports 470 partially obstruct the path of electromagnetic wave propagation. Accordingly, fewer strut subreflector supports 470 are generally preferred.

In operation of the fourth embodiment of a DIPA 400, a lower frequency electromagnetic wave, or signal, may emanate from the lower frequency coaxial horn 420 and be reflected off of the bottom surface 465 of subreflector 460 to illuminate a main reflector (not shown) of larger diameter which bounces the wave a toward its intended location, typically another antenna (not shown) located some distance away, e.g., from satellite to earth or vice versa. Alternatively as noted above, a lower frequency electromagnetic wave may travel in the opposite direction, first reflecting off of the bottom surface 465 of subreflector 460 before entering into the lower frequency coaxial horn 420 for further signal processing via lower frequency coaxial turnstile 410.

Figure 7:
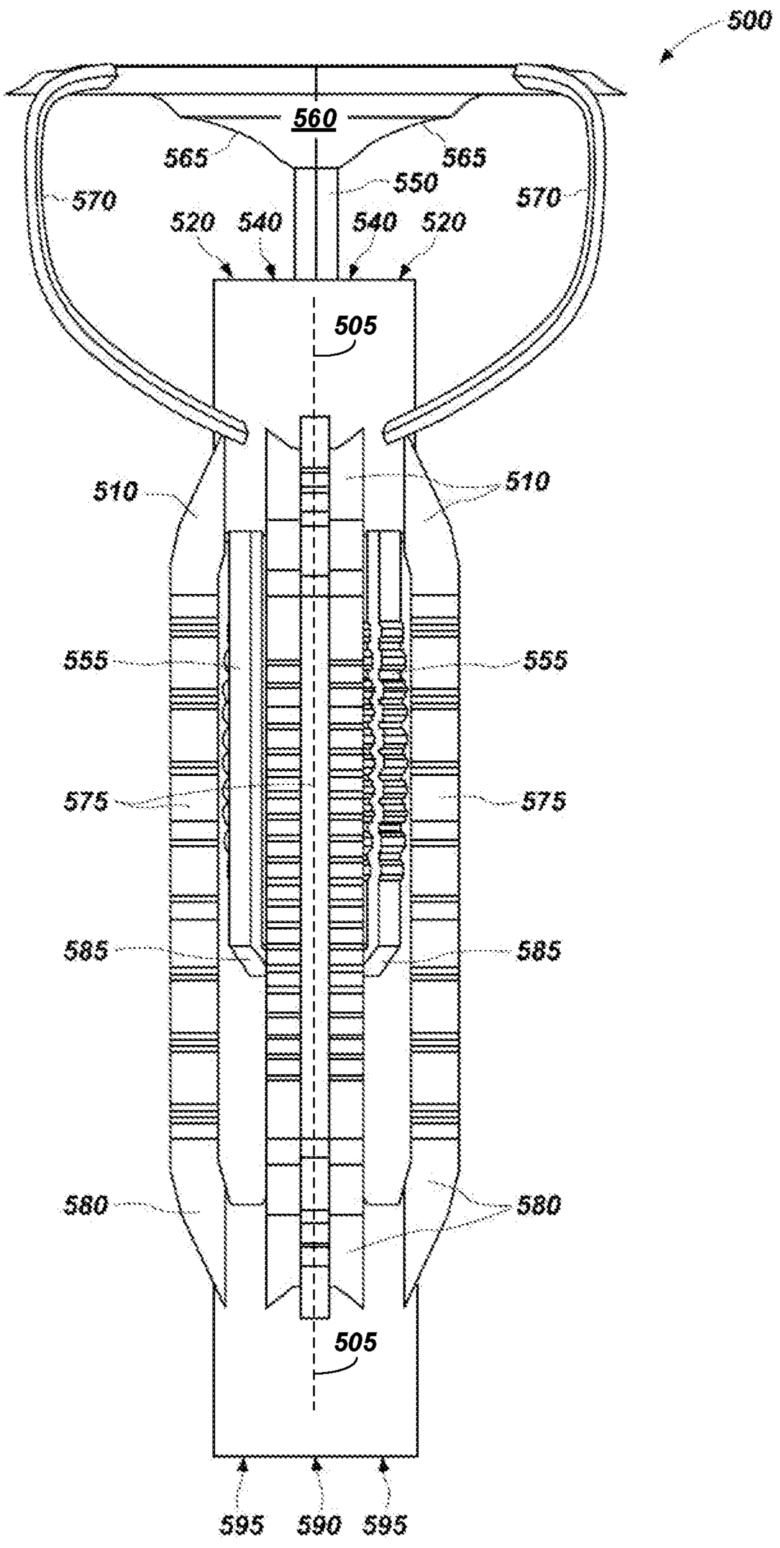
FIG. 7 is a side-view of a fifth embodiment of a DIPA, according to the present invention.

FIG. 7 is a full side-view of a fifth embodiment of a DIPA 500, according to the present invention. The fifth embodiment of a DIPA 500 may include a lower frequency coaxial input 595 feeding a lower frequency input coaxial turnstile 580, which in turn feed lower frequency polarizer phase shifting arms 575 (three of four shown, the fourth arm 575 hidden behind), which in turn feed the lower frequency outer coaxial turnstile 510, and finally a lower frequency outer coaxial horn 520. DIPA 500 includes a longitudinal axis 505 as shown in FIG. 7. It will be understood that other embodiments of the dual-band integrated antenna feeds disclosed herein will inherently have a longitudinal axis as well. The four lower frequency polarizer phase shifting arms 575 are oriented at 90° intervals and parallel to the longitudinal axis 505, as shown in FIG. 7. It will further be understood that polarizer phase shifting arms of the other dual-band integrated antenna feeds disclosed herein have polarizer phase shifting arms that are also oriented at 90° intervals and parallel to the longitudinal axis of the associated feed as well.

The fifth embodiment of a DIPA 500 may further include a higher frequency circular waveguide input 590 (not visible in FIG. 7, but located inside the lower frequency coaxial input 595 at bottom of FIG. 7), which feeds a higher frequency input circular waveguide turnstile 585 (partially obstructed by the center lower frequency polarizer phase shifting arm 575), which in turn feeds higher frequency polarizer phase shifting arms 565 (two of four shown, the other two arms 565 hidden behind), which in turn feeds a higher frequency inner coaxial turnstile 530 (not visible in FIG. 7, but, embedded within the lower frequency output coaxial turnstile 510 and polarizer arms 565, 575), and finally which feeds a higher frequency inner coaxial horn (not visible, but see arrows 540), The higher frequency inner coaxial horn 540 is located inside lower frequency outer coaxial horn 520).

The fifth embodiment of a DIPA 500 may further include a subreflector 560, a coaxial subreflector support 550 and strut subreflector supports 570 (two of four shown in FIG. 7, the other two hidden behind the two supports 570 shown). Subreflector 560 is physically supported by the subreflector support 550 and strut subreflector supports 570. This fifth embodiment of a DIPA 500 supports dual circular polarization on both the lower and higher frequency bands.

Figure 8:
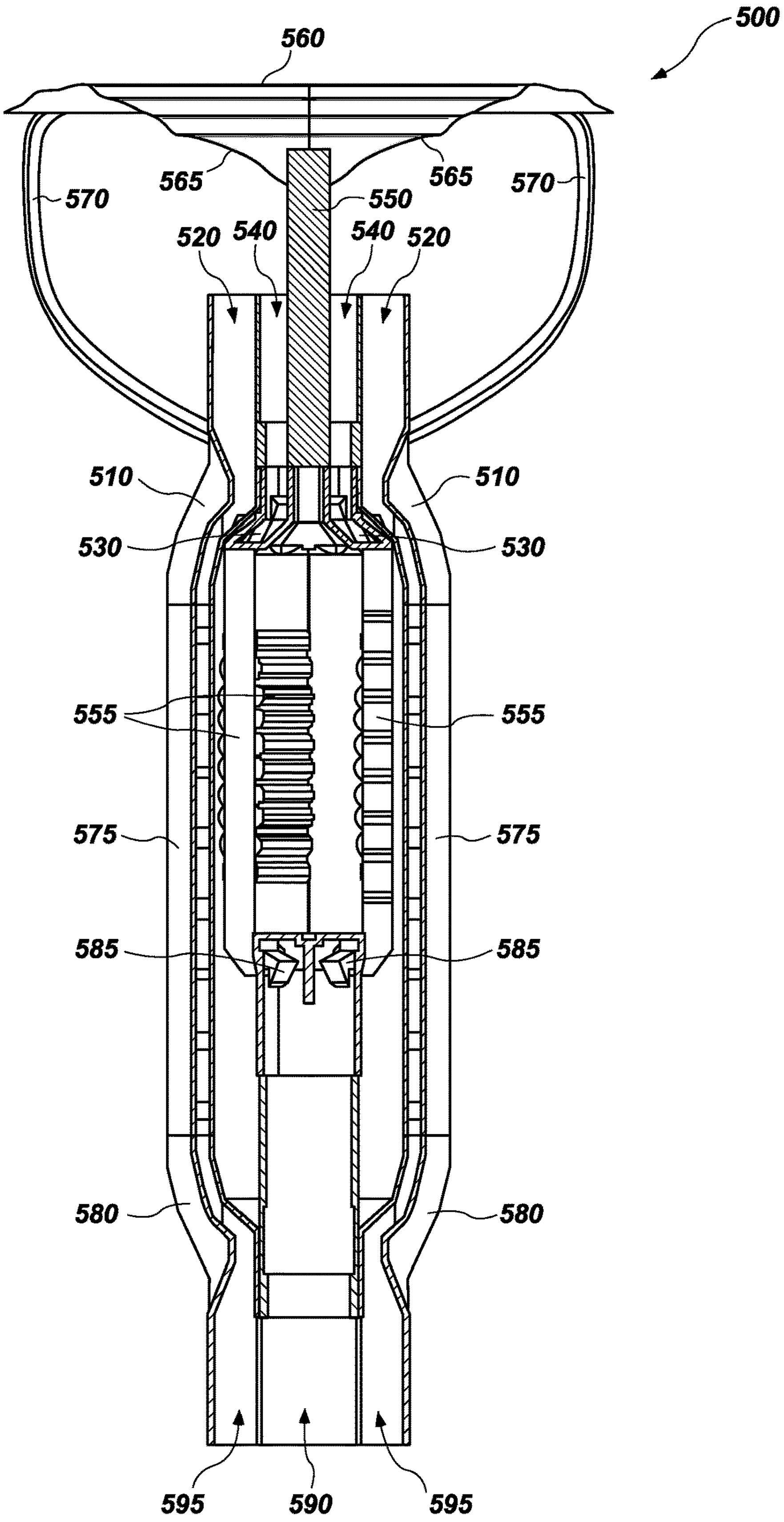
FIG. 8 is a cross-sectional side view of the fifth embodiment of a DIPA shown in FIG. 7, according to the present invention.

FIG. 8 is a cross-sectional side view of a fifth embodiment of a DIPA 500 shown in FIG. 7, according to the present invention. More particularly, the fifth embodiment of a DIPA shown in FIG. 8 may include a lower frequency coaxial input 595, which feeds a lower frequency input coaxial turnstile 580, which in turn feeds lower frequency polarizer phase shifting arms 575 (two of four shown in cross-section, the other two arms 575 are located front and back center), which in turn feeds the lower frequency outer coaxial turnstile 510 and finally which feeds the lower frequency outer coaxial horn 520. The fifth embodiment of a DIPA shown in FIG. 8 may further include a higher frequency circular waveguide input 590, which feeds a higher frequency input circular waveguide turnstile 585, which in turn feeds higher frequency polarizer phase shifting arms 565 (three of four shown in the cross-section of FIG. 8), which in turn feeds the higher frequency inner output coaxial turnstile 530 and finally which in turn feeds the higher frequency inner coaxial horn 540. The fifth embodiment of a DIPA shown in FIG. 8 may further include a subreflector 560 physically supported by a coaxial subreflector support 550, and strut subreflector supports 570 (two of four shown).

As noted above, this embodiment of the DIPA supports dual circular polarization on both the lower and higher frequency bands.

Because of the cross-sectional view of DIPA 500, only two strut subreflector supports 570 are shown in FIG. 8. However, it will be understood that any suitable number, e.g., 3-6, of evenly dispersed strut subreflector supports 570 may be employed to support subreflector 560, according to other embodiments of the invention. It will be further understood that strut subreflector supports 570 partially obstruct the path of electromagnetic wave propagation. Accordingly, fewer strut subreflector supports 570 are generally preferred. For other embodiments of a DIPA (not shown), no strut subreflector supports are necessary at all, because of the physical support provided by subreflector supports, 150, 350, 450 and 550. For example, see U.S. Pat. No. 9,742,069 to Hollenbeck et al., the contents of which are incorporated by reference for all purposes as if fully set forth herein.

In low frequency operation of the fifth embodiment of a DIPA 500, a lower frequency electromagnetic wave, or signal, may emanate from a transmitter, or other energy source, (not shown, but in communication with the lower frequency coaxial input 595) which would propagate through the lower frequency input coaxial turnstile 580 to become circularly polarized in the lower frequency polarizer phase shifting arms 575, transition through the lower frequency outer coaxial turnstile 510 and exit the lower frequency outer coaxial horn 520, then bounce off the bottom surface 565 of the subreflector 560 to illuminate a main reflector (not shown) of larger diameter which bounces the wave a toward its intended location, typically another antenna (not shown) located some distance away, e.g., from satellite to earth or vice versa. Alternatively as noted above, a lower frequency electromagnetic wave, or signal, may travel in the opposite direction to a receiver, or other processor, (not shown) in communication with the lower frequency coaxial input 595.

It will be understood that high frequency operation of DIPA 500 is analogous beginning with a high frequency signal emanating from a transmitter, or other energy source, (not shown, but in communication with the higher frequency circular waveguide input 590), which would propagate through the higher frequency input coaxial turnstile 585 to become circularly polarized in the higher frequency polarizer phase shifting arms 555, then transitioning through the higher frequency inner coaxial turnstile 530, exiting the higher frequency inner coaxial horn 540, bouncing off of the bottom surface 565 of the subreflector 560 and be directed to its intended target, typically another antenna (not shown) located at some distance away from DIPA 500. Alternatively as noted above, a higher frequency electromagnetic wave, or signal, may travel in the opposite direction to a receiver, or other processor, (not shown) in communication with the higher frequency circular input 590. Thus, bidirectional, dual-band, signal travel may occur through DIPA 500.

Figure 9:
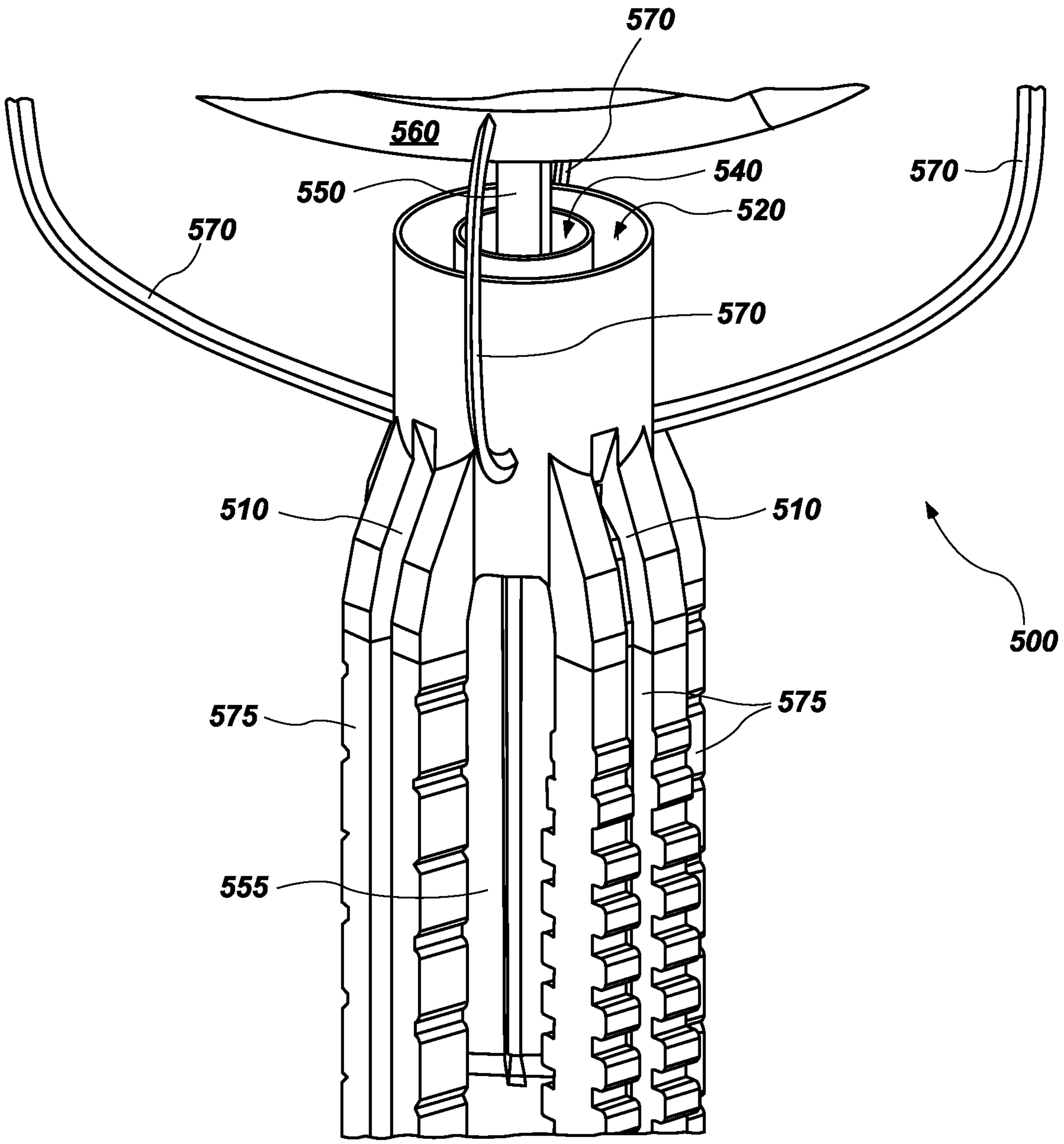
FIG. 9 is a partial top perspective view of the fifth embodiment of a DIPA shown in FIGS. 7 and 8.

FIG. 9 is a partial top perspective view of the fifth embodiment of the DIPA 500 shown in FIGS. 7 and 8. More particularly, the fifth embodiment of a DIPA 500 as shown in FIG. 9 may include a lower frequency polarizer phase shifting arms 575, a lower frequency outer coaxial turnstile 510, a lower frequency outer coaxial horn 520, higher frequency polarizer phase shifting arms 555, a higher frequency inner coaxial turnstile (not shown, but embedded within the lower frequency outer coaxial turnstile 510) and a higher frequency inner coaxial horn 540. The fifth embodiment of a DIPA 500 as shown in FIG. 9 may further include a subreflector 560 physically supported by a coaxial subreflector support 550 and four strut subreflector supports 570. As noted above, this fifth embodiment of the DIPA 500 supports dual circular polarization on both the lower and higher frequency bands.

Figure 10:
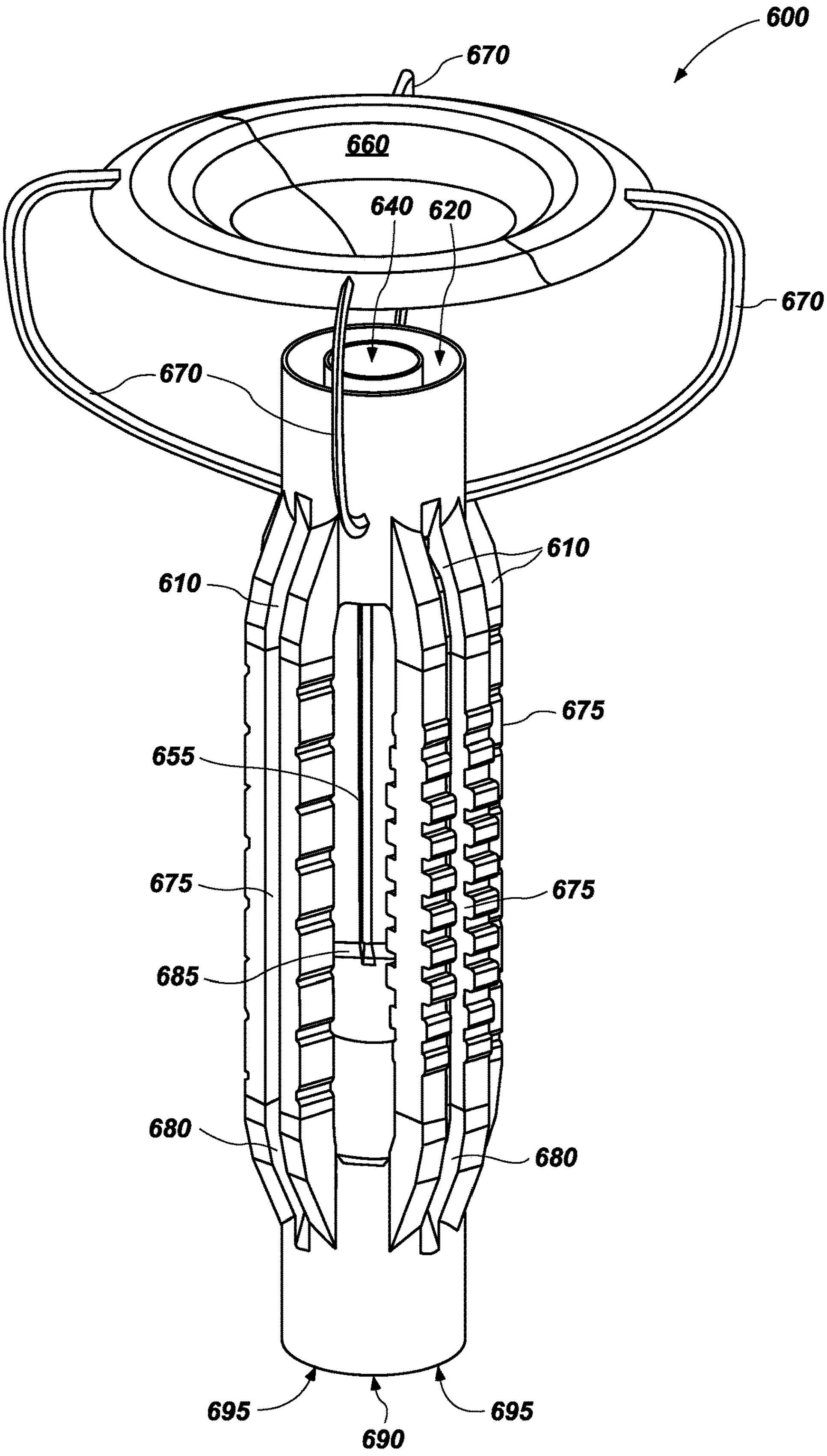
FIG. 10 is a top perspective view of a sixth embodiment of a DIPA, according to the present invention.

FIG. 10 is a top perspective view of a sixth embodiment of a DIPA 600, according to the present invention. More particularly, the sixth embodiment of a DIPA 600 illustrated in FIG. 10 may include a lower frequency coaxial input 695, leading to a lower frequency input coaxial turnstile 680, branching into lower frequency polarizer phase shifting arms 675 (two shown fully, one partially and one hidden in back), which converges in a lower frequency outer coaxial turnstile 610 into a lower frequency outer coaxial horn 620. The sixth embodiment of a DIPA 600 illustrated in FIG. 10 may further include a higher frequency circular waveguide input 690, leading to a higher frequency input circular waveguide turnstile 685, branching out to higher frequency polarizer phase shifting arms 655 (four arms 655 total, mostly obstructed in FIG. 10 by arms 675), converging into a higher frequency inner circular turnstile 630 (not shown in FIG. 10, but, embedded within the lower frequency outer coaxial turnstile 610) and exiting through a higher frequency inner circular waveguide horn 640.

The sixth embodiment of a DIPA 600 illustrated in FIG. 10 may further include a subreflector 660 physically supported by four strut subreflector supports 670. Like the embodiment of a DIPA shown in FIGS. 7-9, this embodiment of the DIPA supports dual circular polarization on both the lower and higher frequency bands. Unlike the fifth embodiment of a DIPA shown in FIGS. 7-9, this embodiment of a DIPA does not include a coaxial subreflector support (see, e.g., coaxial subreflector support 550 and related discussion above). High- and low-band frequency operation of the sixth embodiment of a DIPA 600 is analogous to the operation of DIPA 500 except for the high frequency energy exiting and entering a circular horn 640 rather than a coaxial horn 540.

Figure 11:
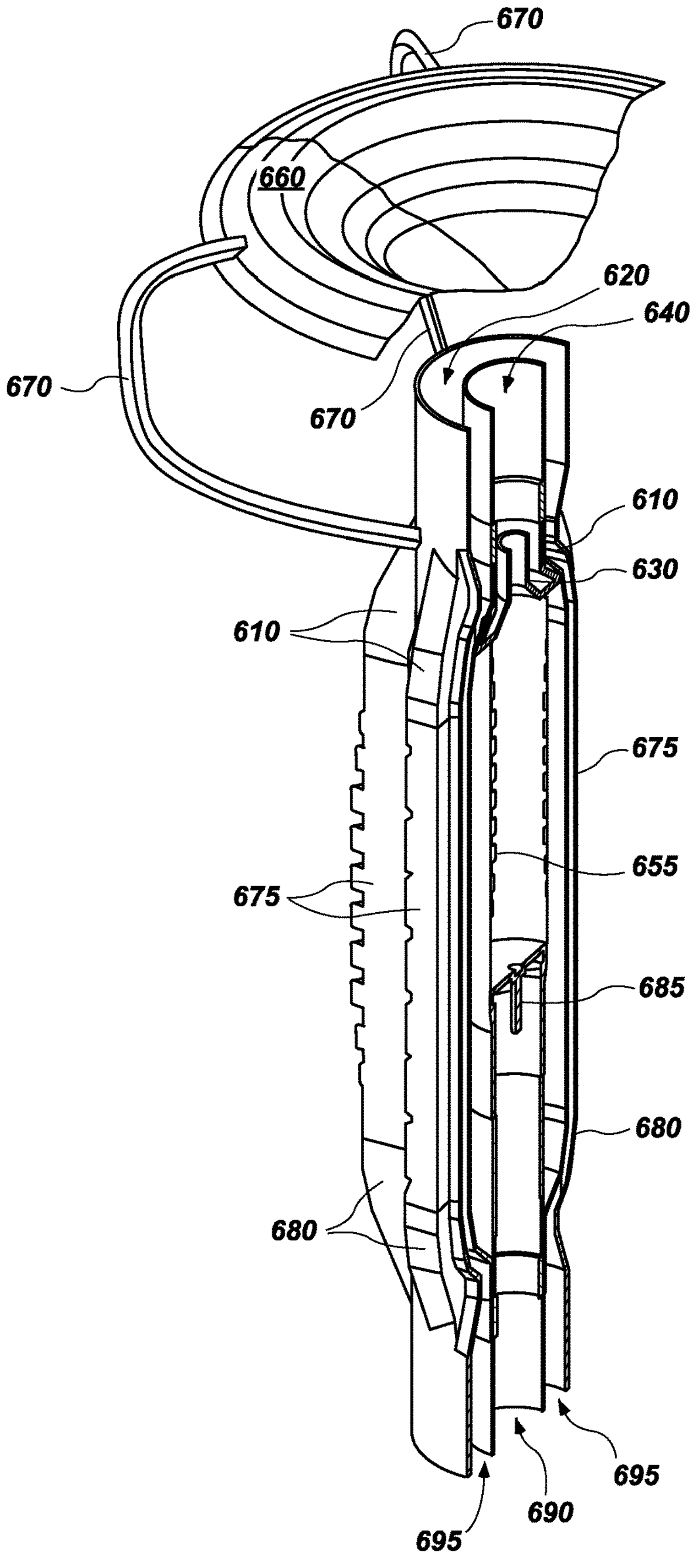
FIG. 11 is a top perspective cross-sectional view of the sixth embodiment of the DIPA shown in FIG. 10, according to the present invention.

FIG. 11 is a top perspective, cross-sectional view of the sixth embodiment of the DIPA 600 shown in FIG. 10, according to the present invention. More particularly, the sixth embodiment of the DIPA 600 shown in FIG. 11 may include a lower frequency coaxial input 695, in communication with a lower frequency input coaxial turnstile 680 (having four branches, three shown in FIG. 11), which in turn communicates with lower frequency polarizer phase shifting arms 675 (three shown), which converges into a lower frequency outer coaxial turnstile 610 and finally exiting a lower frequency outer coaxial horn 620. The sixth embodiment of the DIPA 600 shown in FIG. 11 may further include a higher frequency circular waveguide input 690, in communication with a higher frequency input circular waveguide turnstile 685, which branches out to four higher frequency polarizer phase shifting arms 655 (partially obstructed by, and located within, arms 675), converging into a higher frequency inner circular waveguide turnstile 630 (partially obstructed, but embedded within the lower frequency outer coaxial turnstile 610) and finally exiting higher frequency inner circular waveguide horn 640. The sixth embodiment of the DIPA 600 shown in FIG. 11 may further include a subreflector 660 physically supported by four strut subreflector supports 670. Again, this embodiment of the DIPA supports dual circular polarization on both the lower and higher frequency bands.

Figure 12:
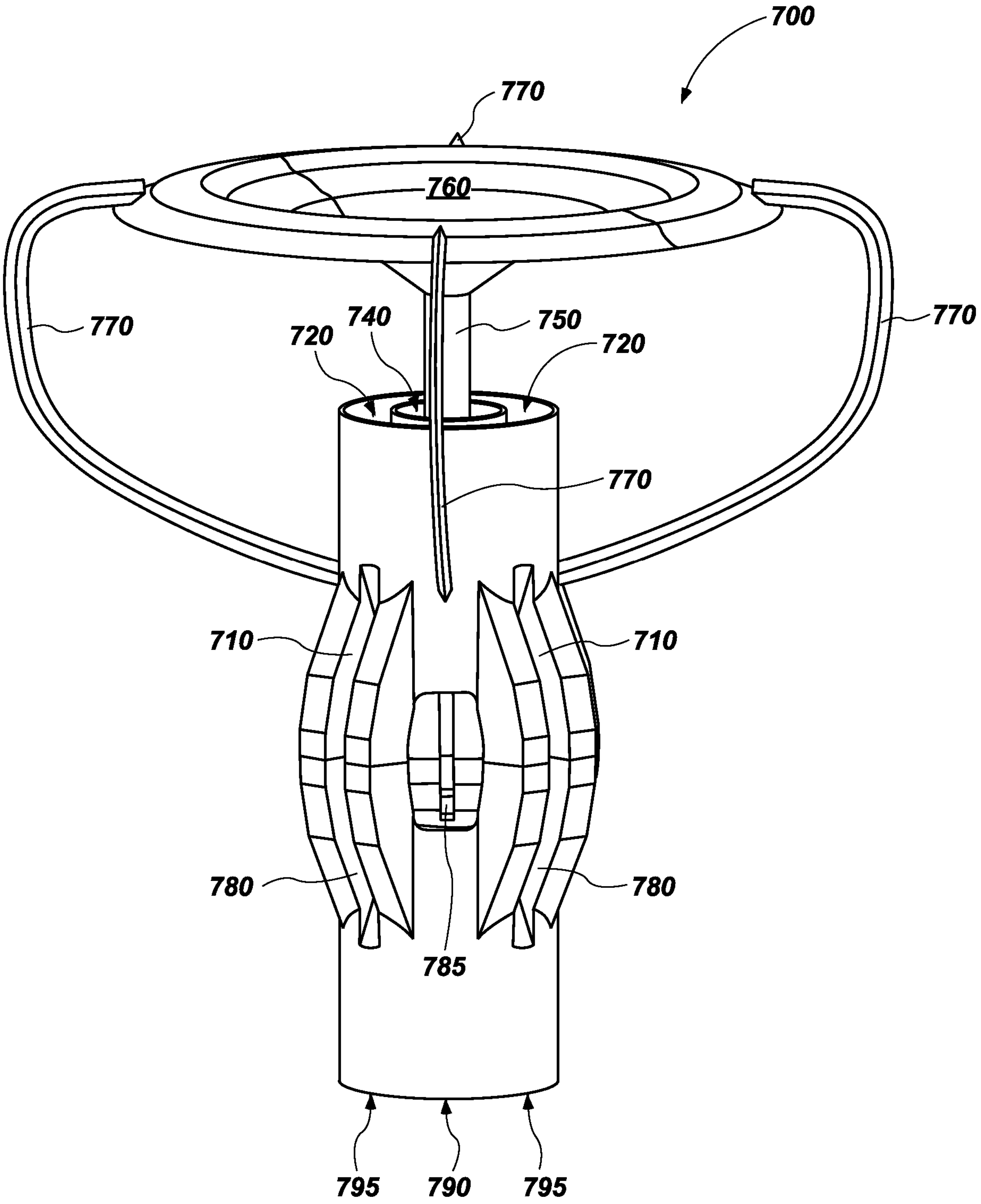
FIG. 12 is a perspective view of a seventh embodiment of a DIPA, according to the present invention.

FIG. 12 is a perspective view of a seventh embodiment of a DIPA 700, according to the present invention. This seventh embodiment of the DIPA 700 supports dual linear polarization on both the lower and higher frequency bands. More particularly, the seventh embodiment of a DIPA 700 as illustrated in FIG. 12 may include a lower frequency coaxial input 795, branching out with a lower frequency input coaxial turnstile 780, transitioning back to a lower frequency outer coaxial turnstile 710, exiting at a lower frequency outer coaxial horn 720. The seventh embodiment of a DIPA 700 as illustrated in FIG. 12 may further include a higher frequency circular waveguide input 790, branching out to a higher frequency input circular waveguide turnstile 785 (mostly obstructed from view in FIG. 12, but located inside lower frequency input coaxial turnstile 780), converging back in with a higher frequency inner coaxial turnstile 730 (not visible in FIG. 12, but embedded within the lower frequency outer coaxial turnstile 710) and finally opening up to a higher frequency inner coaxial horn 740.

The seventh embodiment of a DIPA 700 as illustrated in FIG. 12 may further include a subreflector 760 physically supported by a coaxial subreflector support 750 and four strut subreflector supports 770. Again, this embodiment of the DIPA supports dual linear polarization on both the lower and higher frequency bands. It will be understood that any suitable number, e.g., 3-6, of evenly dispersed strut subreflector supports 770 may be employed to support subreflector 760, according to other embodiments of the invention. It will be further understood that strut subreflector supports 770 partially obstruct the path of electromagnetic wave propagation. Accordingly, fewer strut subreflector supports 770 are generally preferred as long as the mechanical requirements necessary to support the subreflector 760 are met.

Figure 13:
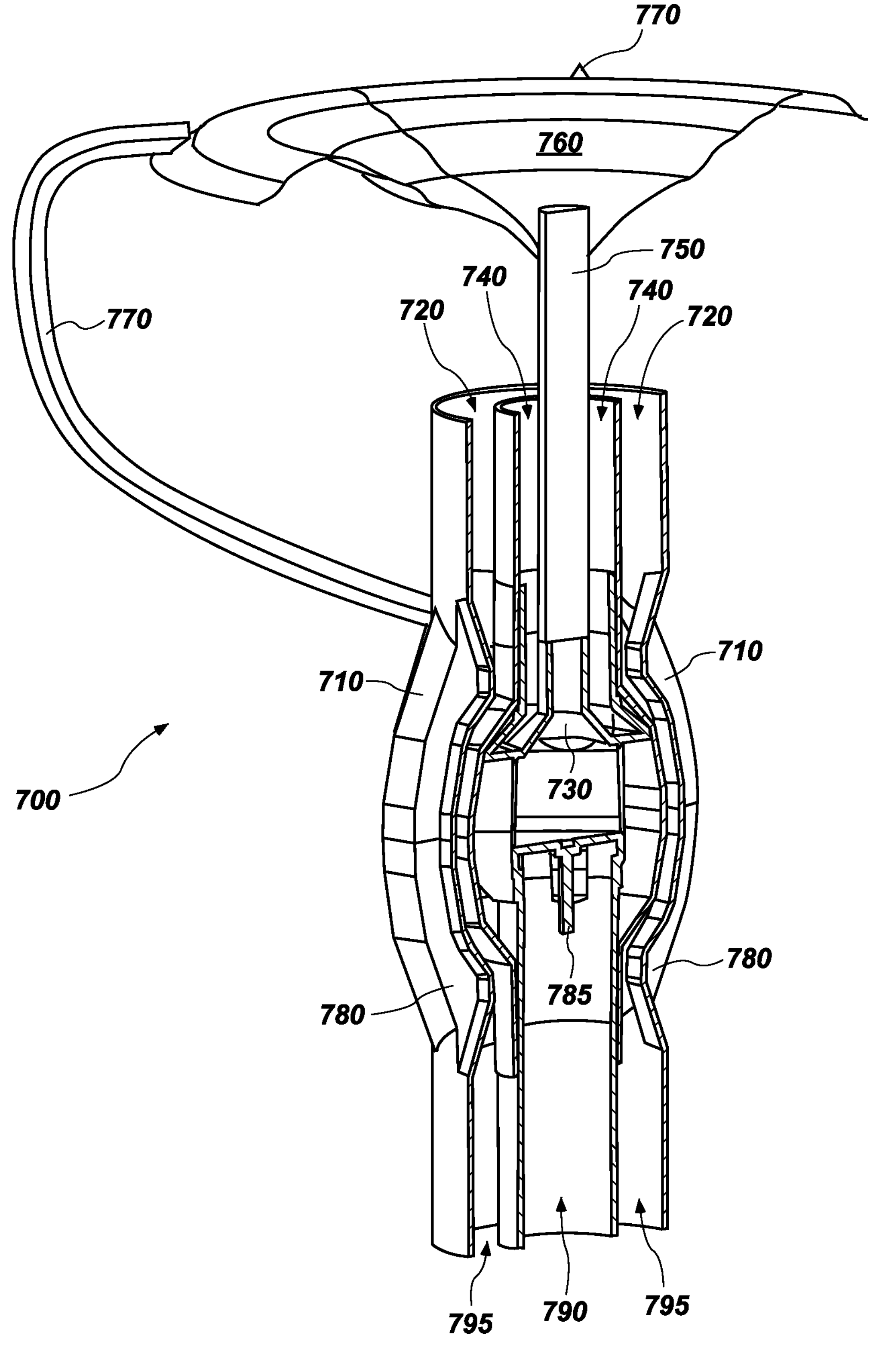
FIG. 13 is a perspective cross-sectional view of the seventh embodiment of a DIPA shown in FIG. 12, according to the present invention.

FIG. 13 is a perspective cross-sectional view of the seventh embodiment of a DIPA 700 shown in FIG. 12, according to the present invention. More particularly, the seventh embodiment of a DIPA 700 shown in FIG. 12 may include a lower frequency coaxial input 795, leading to a lower frequency input coaxial turnstile 780, which in turn branches out to a lower frequency outer coaxial turnstile 710, which in turn converges into the lower frequency outer coaxial horn 720. The seventh embodiment of a DIPA 700 shown in FIG. 12 may further include a higher frequency circular waveguide input 790, which leads to a higher frequency input circular waveguide turnstile 785 (shown partially in FIG. 13, but located inside the lower frequency input coaxial turnstile 780), which in turn branches outward toward the higher frequency inner coaxial turnstile 730 (shown partially in FIG. 13, but embedded within the lower frequency outer coaxial turnstile 710), which in turn converges into the higher frequency inner coaxial horn 740. The seventh embodiment of a DIPA 700 shown in FIG. 12 may further include a subreflector 760 physically supported by a coaxial subreflector support 750 and the four strut subreflector supports 770. As previously noted, this seventh embodiment of the DIPA 700 supports dual linear polarization on both the lower and higher frequency bands.

Figure 14:
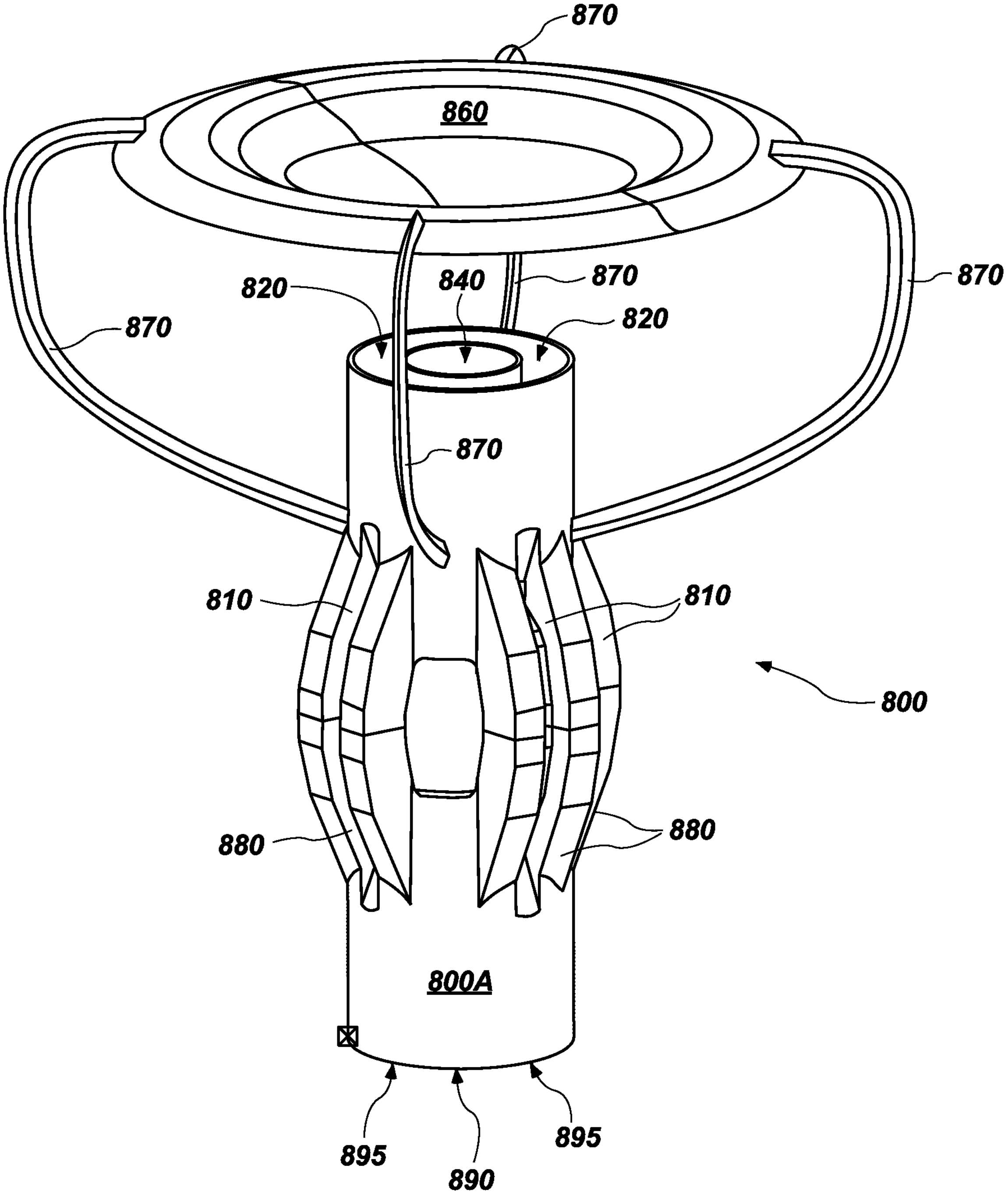
FIG. 14 is a perspective view of an eighth embodiment of a DIPA, according to the present invention.

FIG. 14 is a perspective view of an eighth embodiment of a DIPA 800, according to the present invention. This eighth embodiment of a DIPA 800 supports dual linear polarization on both the lower and higher frequency bands. Unlike the embodiment of a DIPA 700 shown in FIGS. 12-13, this eighth embodiment of a DIPA 800 does not include a coaxial subreflector support 750. Physical support of the subreflector 860 is achieved by the strut subreflector supports 870 only.

More particularly, the eighth embodiment of the DIPA 800 shown in FIG. 14 may include a lower frequency coaxial input 895, which leads to a lower frequency input coaxial turnstile 880, which in turn branches out to a lower frequency outer coaxial turnstile 810, which in turn converges into a lower frequency outer coaxial horn 820. The eighth embodiment of the DIPA 800 shown in FIG. 14 may further include a higher frequency circular waveguide input which leads directly to a higher frequency inner circular waveguide horn 840. DIPA 400 may further include a subreflector 860, which is physically supported by the four strut subreflector supports 870 as noted above.

Figure 15:
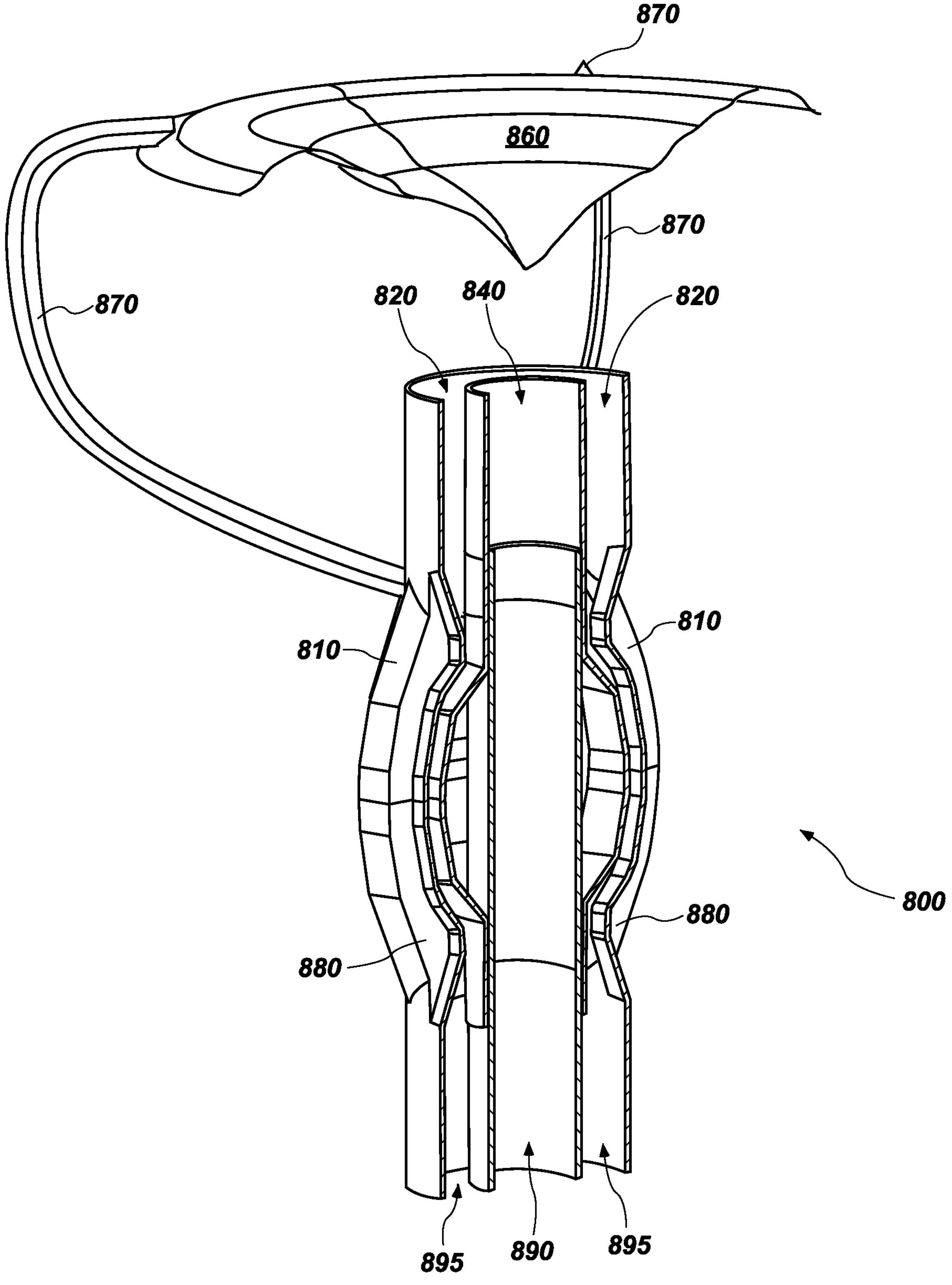
FIG. 15 is a perspective cross-sectional view of the eighth embodiment of a DIPA shown in FIG. 14, according to the present invention.

FIG. 15 is a perspective cross-sectional view of the eighth embodiment of a DIPA 800 shown in FIG. 14, according to the present invention. The eighth embodiment of the DIPA 800 shown in FIG. 15 may include a lower frequency coaxial input 895, leading to a lower frequency input coaxial turnstile 880, which in turn leads to a lower frequency outer coaxial turnstile 810, which communicates with the lower frequency outer coaxial horn 820. The eighth embodiment of the DIPA 800 shown in FIG. 15 may further include a higher frequency circular waveguide input 890 which leads directly to the higher frequency inner circular waveguide horn 840. The eighth embodiment of the DIPA 800 shown in FIG. 15 may further include a subreflector 860 physically supported by the four strut subreflector supports 860 (only two shown). As noted above, this eighth embodiment of the DIPA 800 supports dual linear polarization on both the lower and higher frequency bands.

Figure 16:
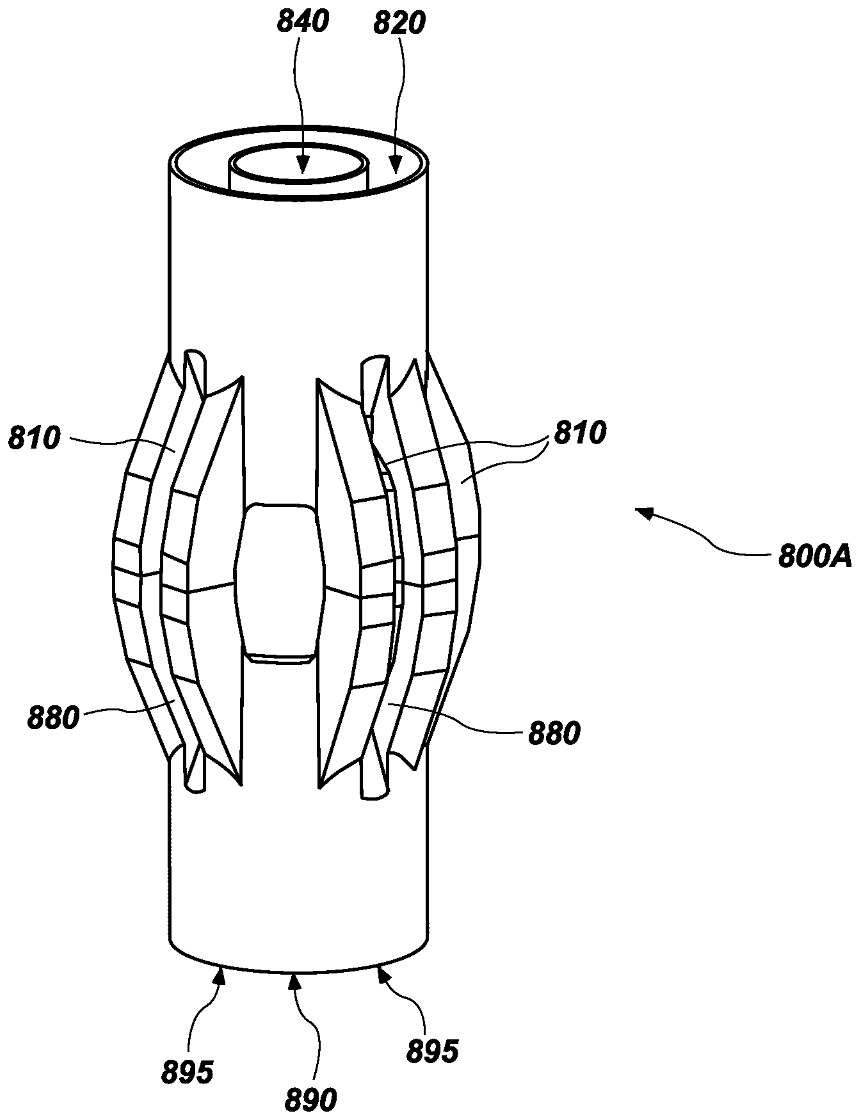
FIG. 16 is a perspective view of an embodiment of a DIPA feed, according to the present invention.
Figure 17:
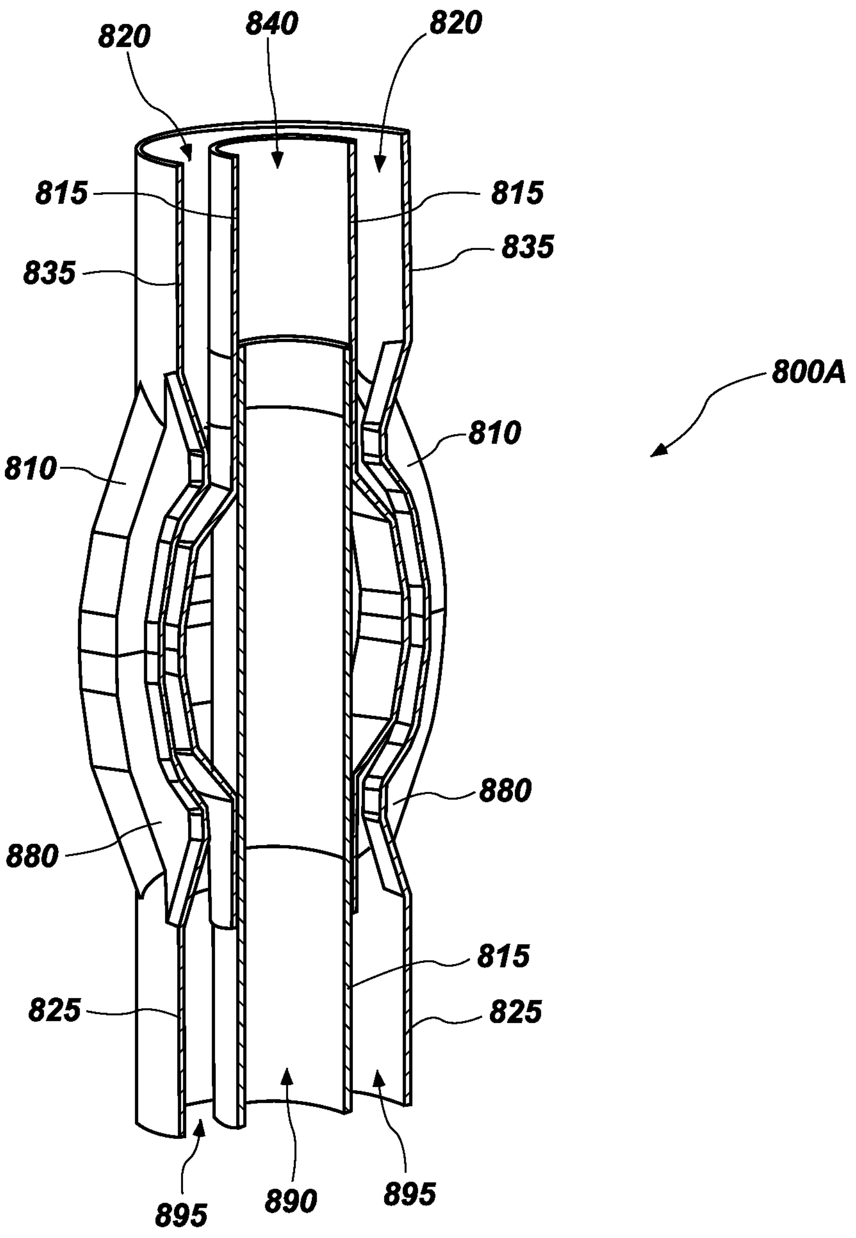
FIG. 17 is a perspective cross-sectional view of the DIPA feed shown in FIG. 16, according to the present invention.

FIGS. 16 and 17 are perspective and cross-sectional views, respectively, of an embodiment of a DIPA feed 800A, according to the present invention. DIPA feed 800A is the feed portion of the eighth embodiment of a DIPA 800 shown in FIGS. 14 and 15, by simply removing the subreflector 860 and its strut subreflector supports 870. The embodiment of a DIPA feed 800A shown in FIGS. 16 and 17 may include a lower frequency coaxial input 895, which leads to a lower frequency input coaxial turnstile 880, which in turn branches out (four branches, only two or three branches visible) to a lower frequency outer coaxial turnstile 810, which consolidates the four branches into the lower frequency outer coaxial horn 820. The embodiment of a DIPA feed 800A shown in FIGS. 16 and 17 may further include a higher frequency circular waveguide input 890 directly connected to the higher frequency inner circular waveguide horn 840. This embodiment of a DIPA feed supports dual linear polarization on both the lower and higher frequency bands.

As best shown in the cross-sectional view of FIG. 17 the higher frequency circular waveguide input 890 and higher frequency inner circular waveguide horn 840 are essentially an inner cylindrical member 815 with opening for the input 890 and horn 840 at opposite ends. The lower frequency coaxial input 895 is located between inner cylindrical member 815 and bottom outer cylindrical member 825. The lower frequency outer coaxial horn 820 is disposed between inner cylindrical member 815 and upper outer cylindrical member 835.

Figure 18:
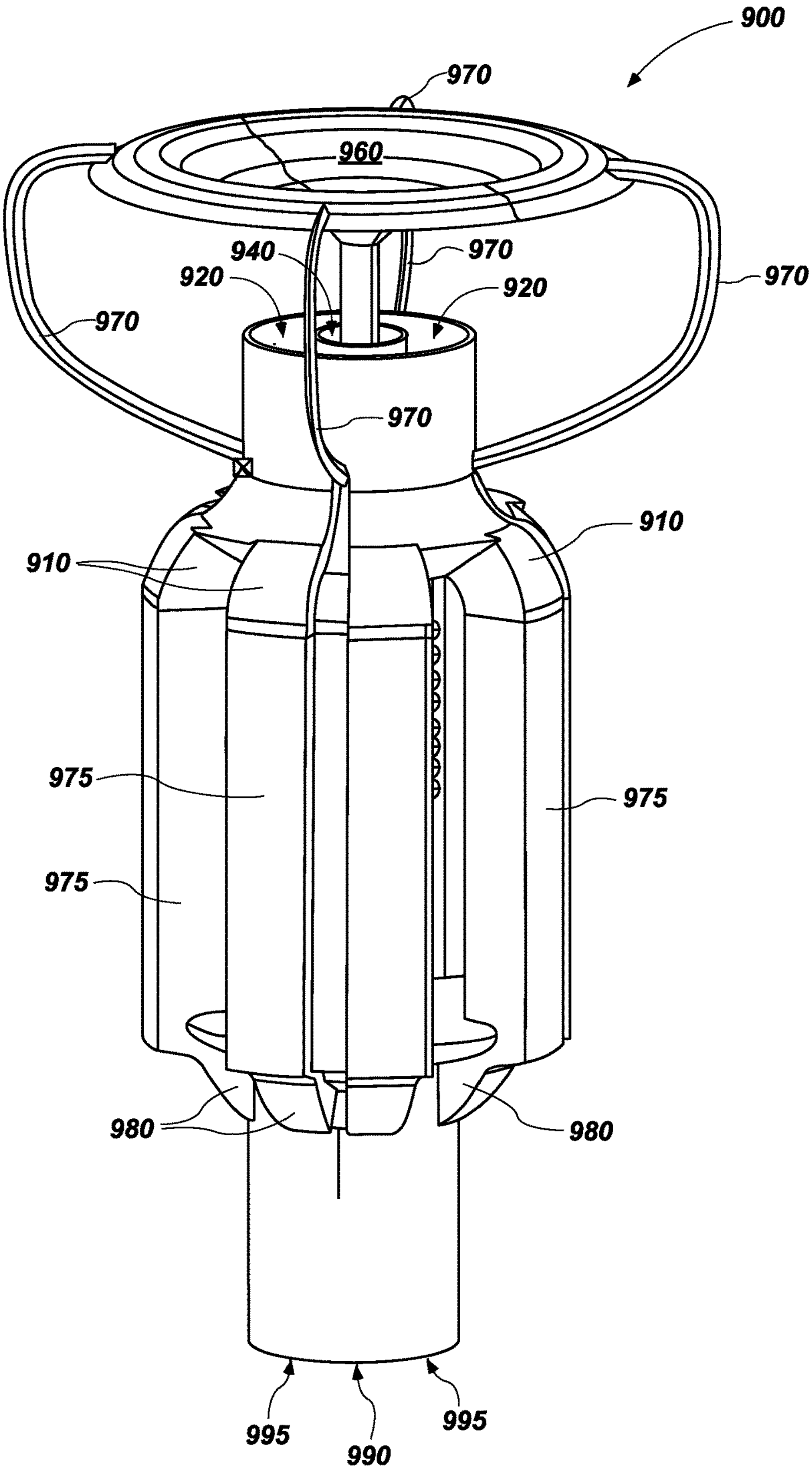
FIG. 18 is a perspective view of a ninth embodiment of a DIPA, according to the present invention.
Figure 19:
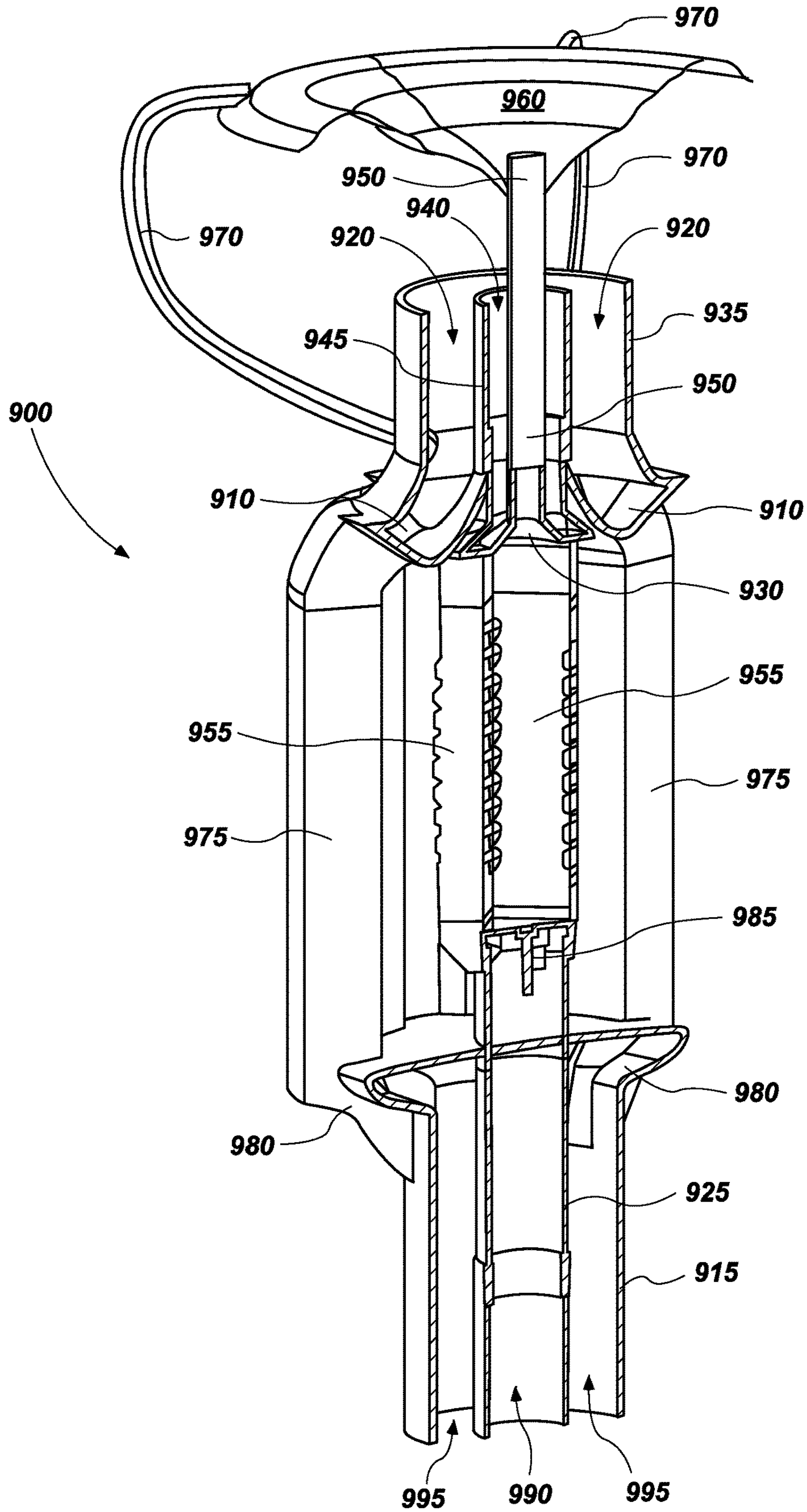
FIG. 19 is perspective cross-sectional view of the ninth embodiment of a DIPA shown in FIG. 18, according to the present invention.

FIGS. 18 and 19 are a perspective and cross-sectional views, respectively, of a ninth embodiment of a DIPA 900, according to the present invention. The ninth embodiment of a DIPA 900 shown in FIGS. 18 and 19 may include an alternate embodiment of the lower frequency band components. More particularly, the ninth embodiment of a DIPA 900 shown in FIGS. 18 and 19 may include a lower frequency coaxial input 995, in communication with a lower frequency input coaxial turnstile 980, which in turn branches out to the lower frequency polarizer phase shifting arms 975 (two shown and four total), which in turn are in communication with the lower frequency outer coaxial turnstile 910, which in turn consolidates the arms into the lower frequency outer coaxial horn 920. The ninth embodiment of a DIPA 900 shown in FIGS. 18 and 19 may further include a higher frequency circular waveguide input 990, which in turn feeds a higher frequency input circular waveguide turnstile 985 (mostly obstructed in the view of FIG. 19, but includes four branches), which in turn feeds the four higher frequency polarizer phase shifting arms 955 (shown only in portion in FIG. 19, but there are four arms 955), which in turn are consolidated into the higher frequency inner coaxial turnstile 930 (partially shown in FIG. 19, but embedded within the lower frequency outer coaxial turnstile 910), which transitions to the higher frequency inner coaxial horn 940. The ninth embodiment of a DIPA 900 shown in FIGS. 18 and 19 may further include a subreflector 960, physically supported by a coaxial subreflector support 950 and four strut subreflector supports 970.

As best shown in the cross-sectional view of FIG. 19 the lower frequency coaxial input 995 is located between bottom inner cylindrical member 925 and bottom outer cylindrical member 915. The lower frequency outer coaxial horn 920 is disposed between upper inner cylindrical member 945 and upper outer cylindrical member 935. This ninth embodiment of a DIPA 900, as shown in FIGS. 18 and 19, supports dual circular polarization on both the lower and higher frequency bands.

Figure 20:
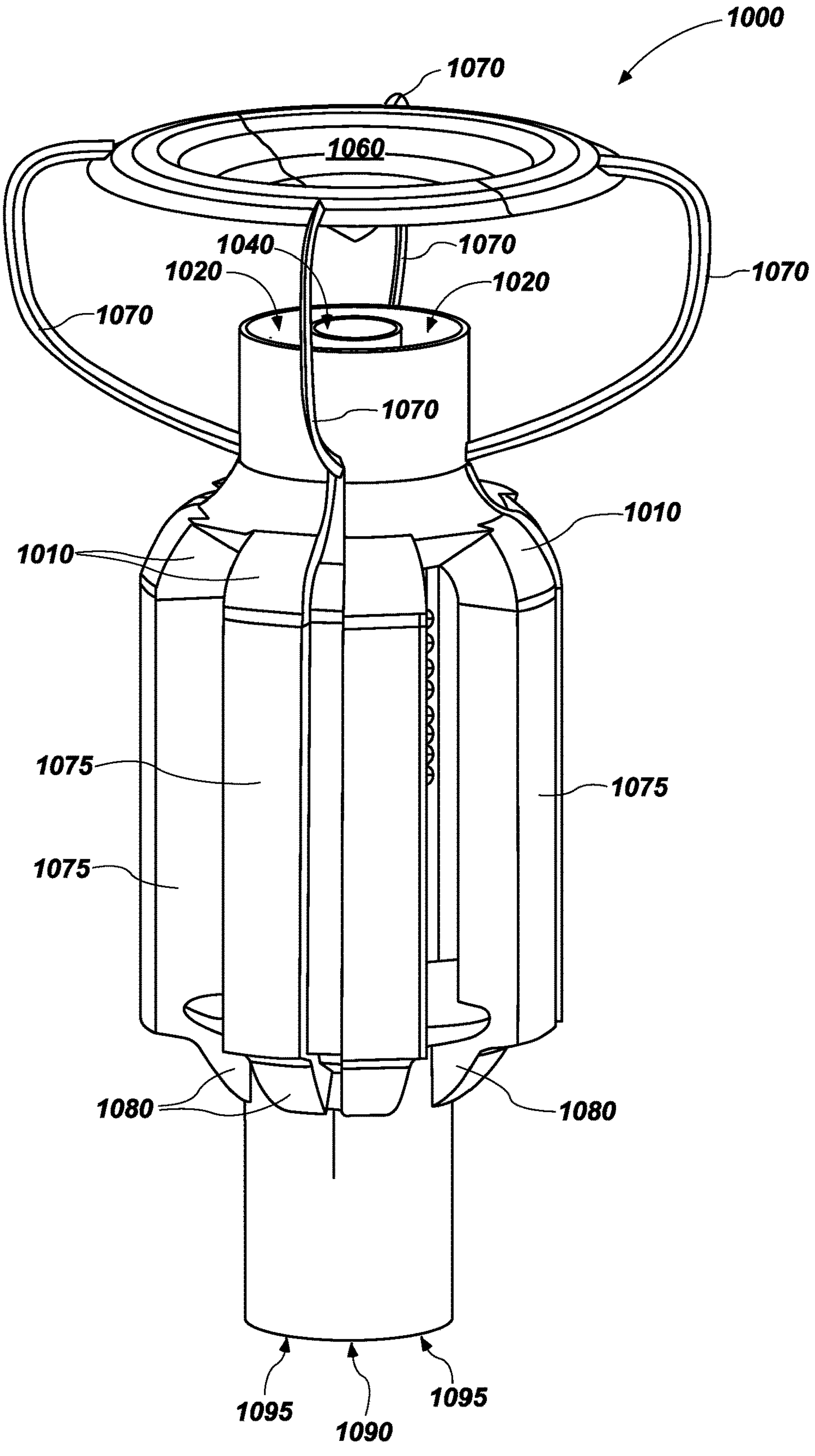
FIG. 20 is perspective view of a tenth embodiment of a DIPA, according to the present invention.
Figure 21:
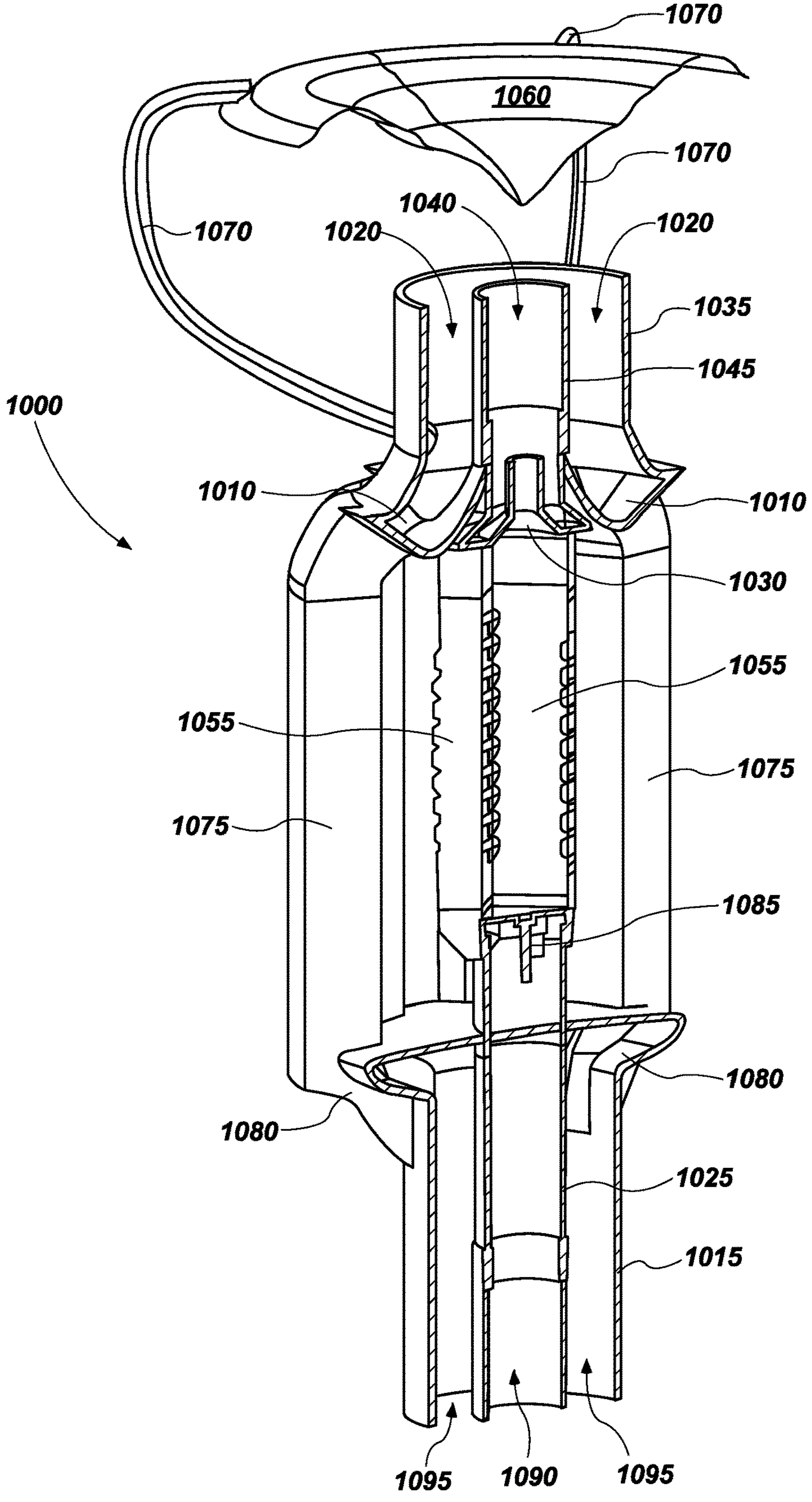
FIG. 21 is a perspective cross-sectional view of the tenth embodiment of a DIPA shown in FIG. 20, according to the present invention.

FIGS. 20 and 21 are perspective and cross-sectional views of a tenth embodiment of a DIPA 1000, according to the present invention. This tenth embodiment of a DIPA 1000 may include an alternate embodiment of the lower frequency band components. The tenth embodiment of a DIPA 1000 shown in FIGS. 20 and 21 may include a lower frequency coaxial input 1095, which feeds a lower frequency input coaxial turnstile 1080, which in turn branches out to the lower frequency polarizer phase shifting arms 1075 (four arms total, dispersed at 90° angles about the axis of DIPA 1000), which in turn is consolidated in communication with the lower frequency outer coaxial turnstile 1010 and finally in communication with the lower frequency outer coaxial horn 1020.

The tenth embodiment of a DIPA 1000 shown in FIGS. 20 and 21 may further include a higher frequency circular waveguide input 1090, which feeds the higher frequency input circular waveguide turnstile 1085, which in turn branches out to the higher frequency polarizer phase shifting arms 1055, which in turn is consolidated in communication with the higher frequency inner coaxial turnstile 1030 (see FIG. 21 for a partial view, but turnstile 1030 is embedded within the lower frequency outer coaxial turnstile 1010) and finally in communication with the higher frequency inner circular waveguide horn 1040. The tenth embodiment of a DIPA 1000 shown in FIGS. 20 and 21 may further include a subreflector 1060 physically supported by four strut subreflector supports 1070.

As best illustrated in FIG. 21, low frequency coaxial input 1095 may be disposed between bottom inner cylindrical member 1025 and bottom outer cylindrical member 1015. Whereas, higher frequency circular waveguide input 1090 may be disposed inside of bottom inner cylindrical member 1025. Higher frequency inner circular horn 1040 may be located within upper inner cylindrical member 1045. The lower frequency outer coaxial horn 1020 may be disposed between upper inner cylindrical member 1045 and upper outer cylindrical member 1035. This tenth embodiment of a DIPA 1000 supports dual circular polarization on both the lower and higher frequency bands.

Figure 22:
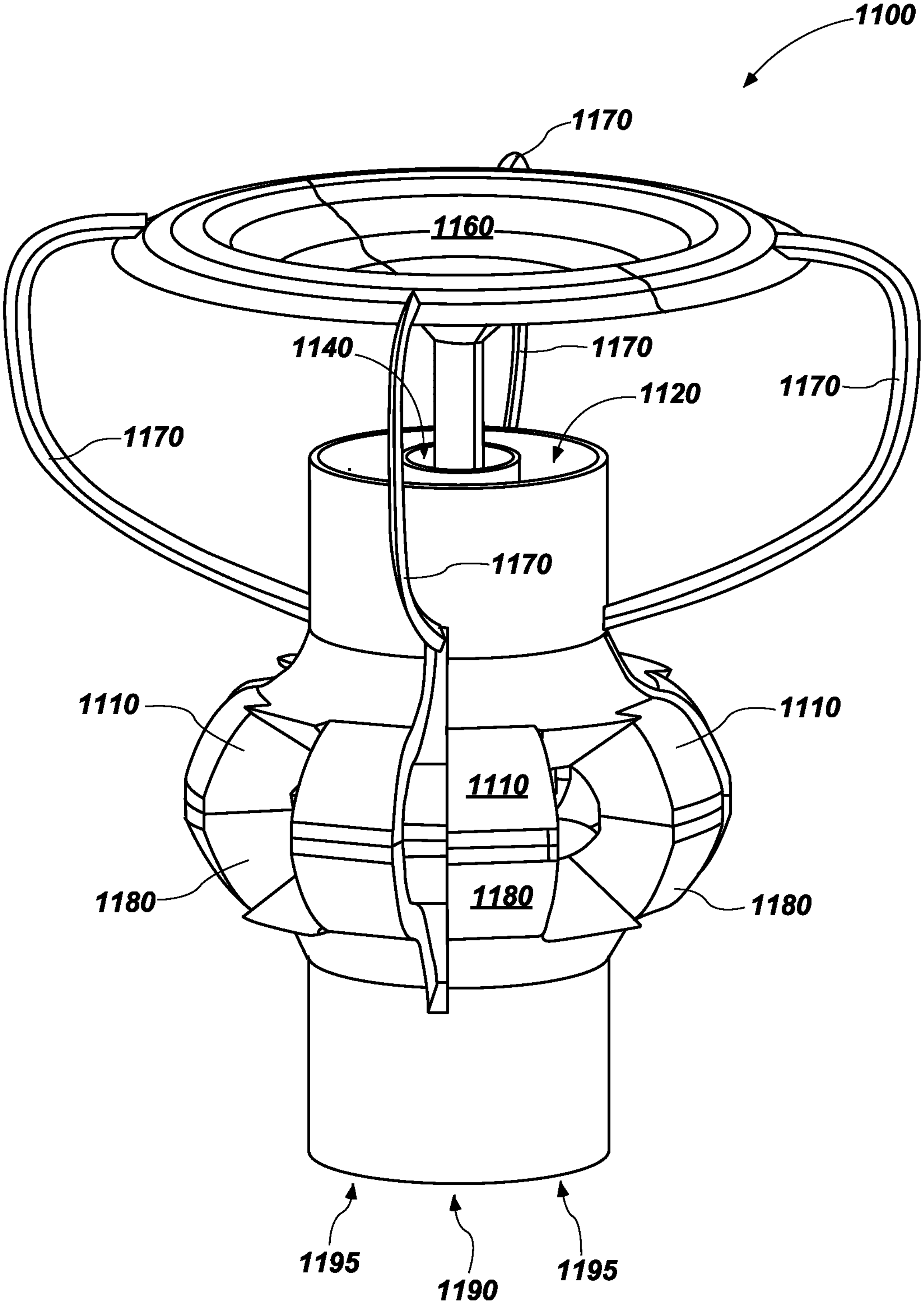
FIG. 22 is a perspective view of an eleventh embodiment of a DIPA, according to the present invention.
Figure 23:
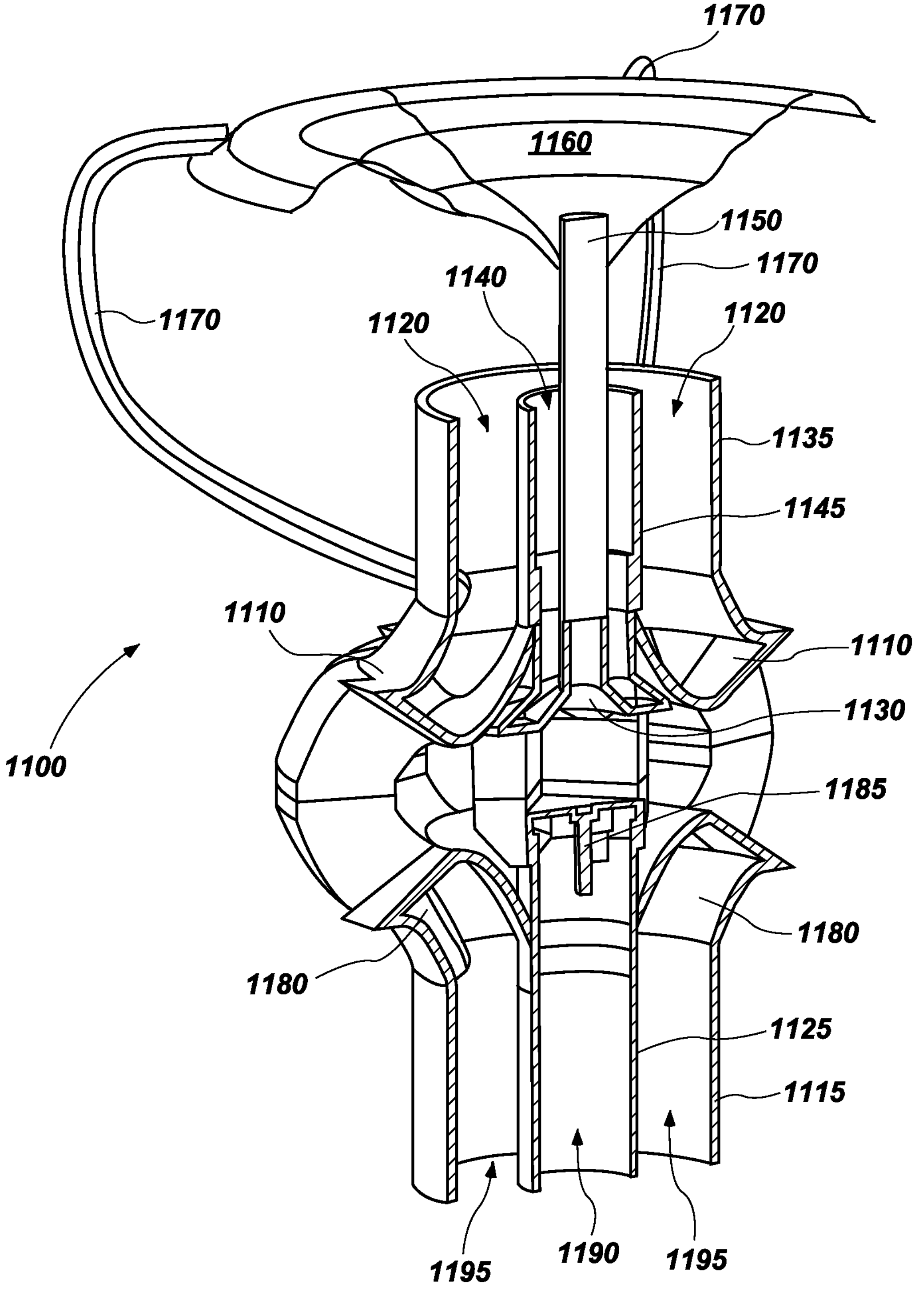
FIG. 23 is a perspective cross-sectional view of the eleventh embodiment of the DIPA shown in FIG. 22, according to the present invention.

FIGS. 22 and 23 are a perspective and cross-sectional views, respectively, of an eleventh embodiment of a DIPA 1100, according to the present invention. The eleventh embodiment of a DIPA 1100 shown in FIGS. 22 and 23 may include yet another alternative embodiment of the lower frequency band components. More particularly, the eleventh embodiment of a DIPA 1100 shown in FIGS. 22 and 23 may include a lower frequency coaxial input 1195, which feeds into a lower frequency input coaxial turnstile 1180, which in turn branches out (four branches total) to a lower frequency outer coaxial turnstile 1110, which in turn converges into the lower frequency outer coaxial horn 1120. The eleventh embodiment of a DIPA 1100 shown in FIGS. 22 and 23 may further include a higher frequency circular waveguide input 1190, which feeds into the higher frequency input circular turnstile 1185, which in turn branches out (four branches total) to the higher frequency inner coaxial turnstile 1130 (best shown in FIG. 23 and embedded within the lower frequency outer coaxial turnstile 1110), which in turn converges into the higher frequency inner coaxial horn 1140. The eleventh embodiment of a DIPA 1100 shown in FIGS. 22 and 23 may further include subreflector 1160 physically supported by coaxial subreflector support 1150 and the four strut subreflector supports 1170.

As best illustrated in the cross-section of FIG. 23, the lower frequency coaxial input 1195 is disposed between bottom inner cylindrical member 1125 and bottom outer cylindrical member 1115. The higher frequency circular waveguide input 1190 is disposed inside of bottom inner cylindrical member 1125. The higher frequency inner coaxial horn 1140 is disposed between upper inner cylindrical member 1145 and coaxial subreflector support 1150. The lower frequency outer coaxial horn 1120 is disposed between upper inner cylindrical member 1145 and upper outer cylindrical member 1135. This eleventh embodiment of a DIPA 1100 shown in FIGS. 22 and 23 supports dual linear polarization on both the lower and higher frequency bands.

Figure 24:
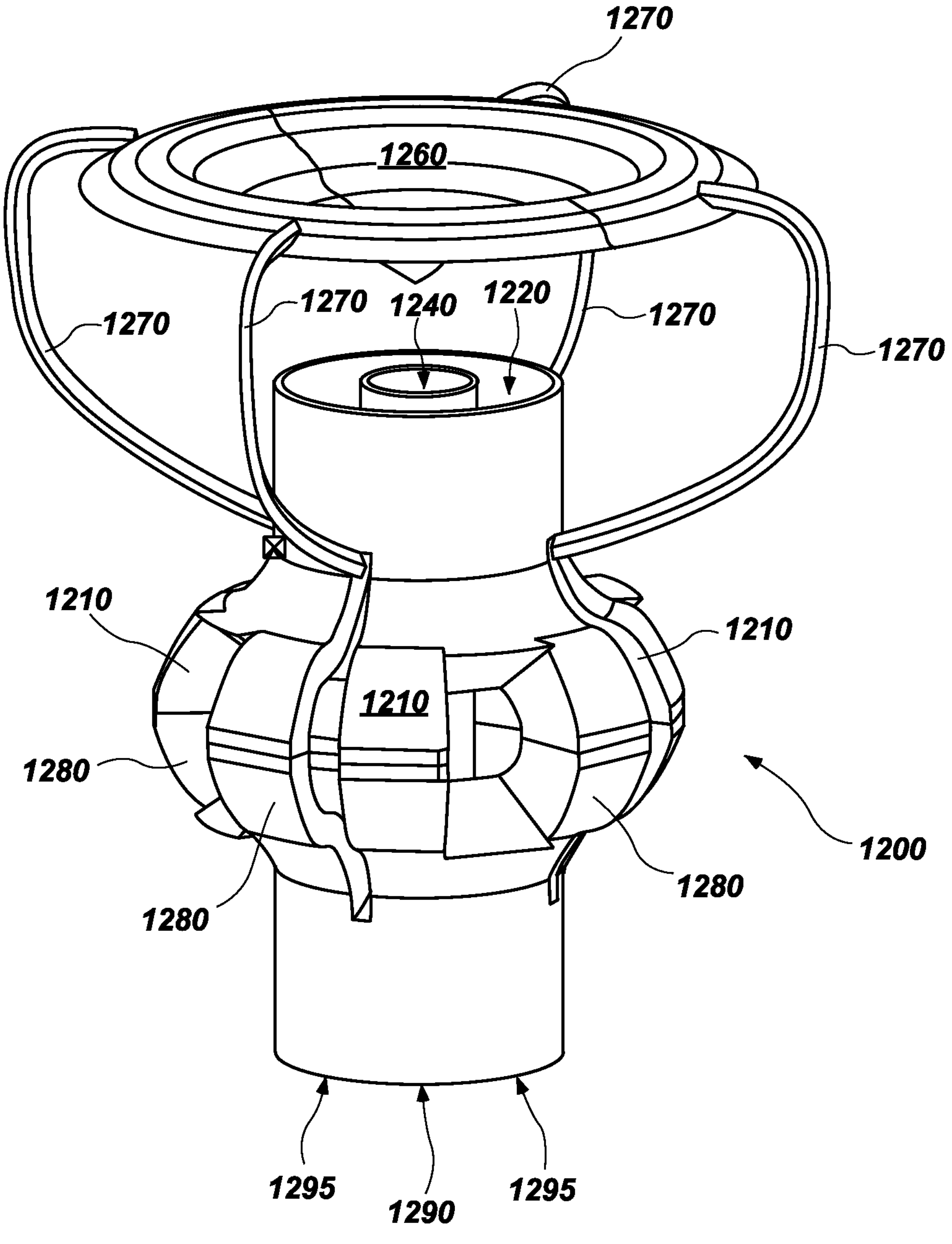
FIG. 24 is a perspective view of a twelfth embodiment of a DIPA, according to the present invention.
Figure 25:
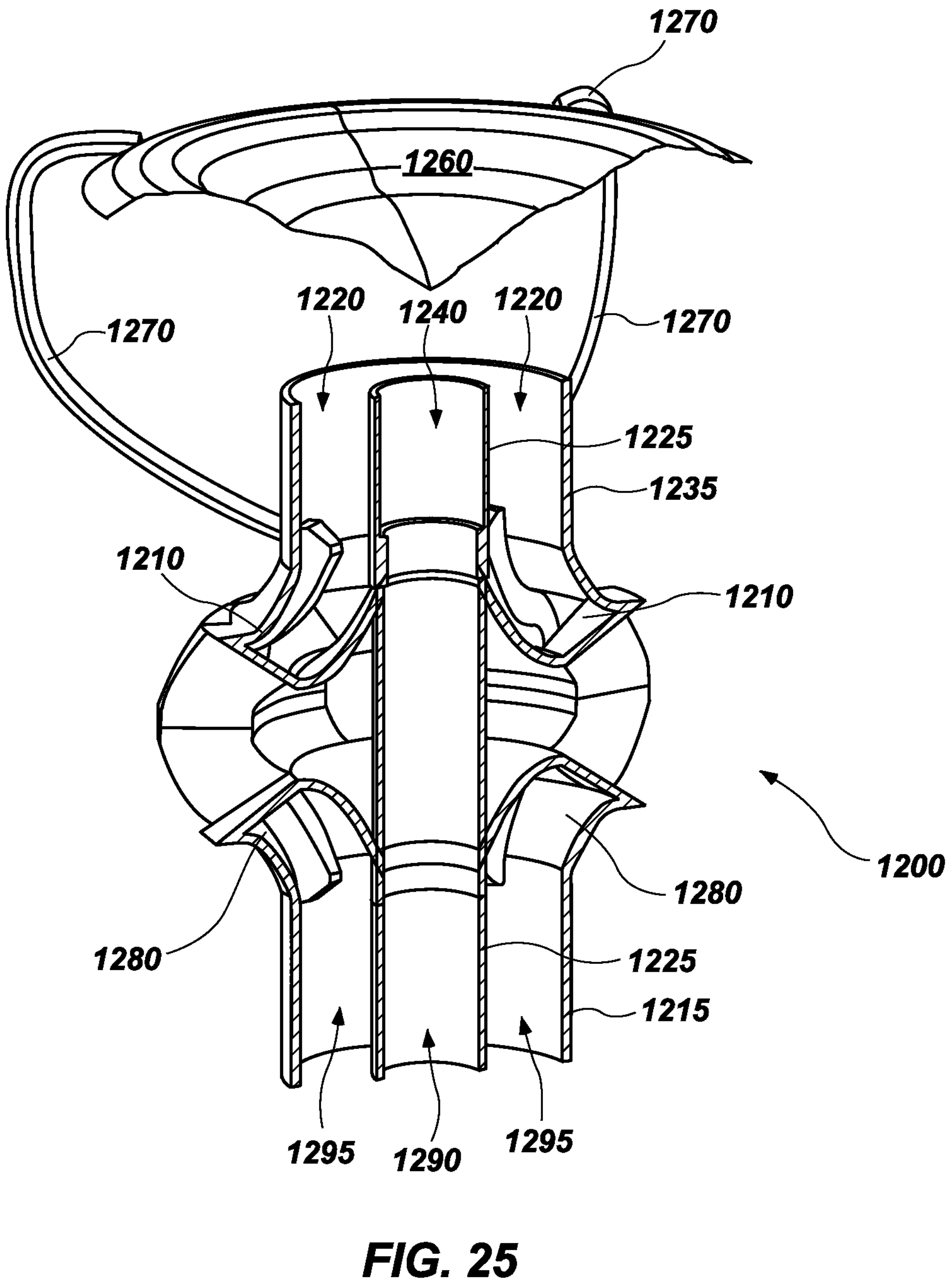
FIG. 25 is a perspective cross-sectional view of the twelfth embodiment of the DIPA shown in FIG. 24, according to the present invention.

FIGS. 24 and 25 are a perspective and cross-sectional views of a twelfth embodiment of a DIPA 1200, according to the present invention. The twelfth embodiment of a DIPA 1200 shown in FIGS. 24 and 25 may include an alternate embodiment of the lower frequency band components. More particularly, the twelfth embodiment of a DIPA 1200 shown in FIGS. 24 and 25 may include a lower frequency coaxial input 1295, which feeds into a lower frequency input coaxial turnstile 1280, which in turn branches out (four branches total) into the lower frequency outer coaxial turnstile 1210, which in turn converges back into the lower frequency outer coaxial horn 1220. The twelfth embodiment of a DIPA 1200 shown in FIGS. 24 and 25 may further include a higher frequency circular waveguide input 1290 leading directly to the higher frequency inner circular waveguide horn 1240. The twelfth embodiment of a DIPA 1200 shown in FIGS. 24 and 25 may further include the subreflector 1260 physically supported by the four strut subreflector supports 1270. This twelfth embodiment of the DIPA 1200 shown in FIGS. 24 and 25 supports dual linear polarization on both the lower and higher frequency bands.

As best illustrated in the cross-section of FIG. 25, the lower frequency coaxial input 1295 is disposed between inner cylindrical member 1225 and bottom outer cylindrical member 1215. The higher frequency circular input 1290 and higher frequency inner circular horn 1240 are disposed within opposite ends of inner cylindrical member 1225. This twelfth embodiment of the DIPA 1200 shown in FIGS. 24 and 25 supports dual linear polarization on both the lower and higher frequency bands. Having described particular embodiments of a DIPA 100, 200, 300, 400, 500, 600, 700,

800, 900, 1000, 1100 and 1200, with reference to the drawings, some general embodiments of the invention will now be described.

An embodiment of a dual-band antenna feed having an axis is disclosed. The embodiment of an antenna feed may include a lower frequency coaxial input, a lower frequency input coaxial turnstile in communication with the lower frequency coaxial input and a lower frequency outer coaxial turnstile in communication with the lower frequency input coaxial turnstile. The embodiment of an antenna feed may further include a lower frequency outer coaxial horn, a higher frequency circular input located within the lower frequency coaxial input and a higher frequency circular horn in communication with the higher frequency circular input. The higher frequency circular input may be located within the lower frequency outer coaxial horn.

Another embodiment of a dual-band antenna feed may further include a subreflector having a bottom surface directed toward the lower and the higher frequency horns and a plurality of axially dispersed strut subreflector supports. Each of the axially dispersed strut subreflector supports may be connected to the subreflector and the lower frequency outer coaxial horn. In yet another embodiment of a dual-band antenna feed, the plurality of axially dispersed strut subreflector supports, may number between one and six axially dispersed strut subreflector supports. According to a particular embodiment of a dual-band antenna feed, the plurality of axially dispersed strut subreflector supports are exactly four strut subreflector supports dispersed at 90° angles about the axis of the dual-band antenna feed. In still another embodiment, a dual-band antenna feed may further include a plurality of lower frequency polarizer phase shifting arms located in between the lower frequency input turnstile and the lower frequency outer turnstile. In one embodiment, a dual-band antenna feed may further include a higher frequency input circular turnstile in communication with the higher frequency circular input and a higher frequency inner circular turnstile in communication with the higher frequency input circular turnstile. In a particular embodiment, a dual-band antenna feed may further include a plurality of higher frequency polarizer phase shifting arms located in between the higher frequency input circular turnstile and the higher frequency inner circular turnstile. According to still another embodiment, there may be exactly four higher frequency polarizer phase shifting arms. In all of the above embodiments, the dual-band antenna feed may be fabricated as a single piece using metal additive manufacturing.

Another embodiment of a dual-band antenna feed having an axis is disclosed. The embodiment of a dual-band antenna feed may include a lower frequency coaxial input, a lower frequency input coaxial turnstile in communication with the lower frequency coaxial input and a lower frequency outer coaxial turnstile in communication with the lower frequency input coaxial turnstile. The embodiment of a dual-band antenna feed may further include a lower frequency outer coaxial horn, a higher frequency circular input located within the lower frequency coaxial input and a higher frequency coaxial horn in communication with the higher frequency circular input and located within the lower frequency outer coaxial horn.

Another embodiment of a dual-band antenna feed may further include a subreflector having a bottom surface directed toward the lower and the higher frequency horns and a plurality of axially dispersed strut subreflector supports. Each of the axially dispersed strut subreflector supports may be connected to the subreflector and the lower frequency outer coaxial horn. In yet another embodiment, a dual-band antenna feed may further include a coaxial subreflector support located within and extending from the higher frequency coaxial horn. The coaxial subreflector support may be connected to the subreflector and providing physical support to the subreflector. In still another embodiment of a dual-band antenna feed, the plurality of axially dispersed strut subreflector supports may range from between one and six strut subreflector supports. According to a particular embodiment of a dual-band antenna feed, the plurality of axially dispersed strut subreflector supports comprise exactly four strut subreflector supports dispersed at 90° angles about the axis of the dual-band antenna feed. According to one embodiment, a dual-band antenna feed may further include a plurality of lower frequency polarizer phase shifting arms located in between the lower frequency input turnstile and the lower frequency outer turnstile. According to yet another embodiment, a dual-band antenna feed may further include a higher frequency input circular turnstile in communication with the higher frequency circular input and a higher frequency inner coaxial turnstile in communication with the higher frequency input circular turnstile. According to still yet another embodiment, a dual-band antenna feed may further include a plurality of higher frequency polarizer phase shifting arms located in between the higher frequency input circular turnstile and the higher frequency inner coaxial turnstile. According to a particular embodiment, there are precisely four higher frequency polarizer phase shifting arms. In all of the above embodiments, the dual-band antenna feed may be fabricated as a single piece using metal additive manufacturing.

Yet another embodiment of a dual-band antenna feed having an axis is disclosed. The embodiment of a dual-band antenna feed may include a lower frequency coaxial input, a lower frequency input coaxial turnstile in communication with the lower frequency coaxial input and a lower frequency outer coaxial turnstile in communication with the lower frequency input coaxial turnstile. The embodiment of a dual-band antenna feed may further include a plurality of lower frequency polarizer phase shifting arms located in between the lower frequency input turnstile and the lower frequency outer turnstile and a lower frequency outer coaxial horn in communication with the lower frequency outer coaxial turnstile. The embodiment of a dual-band antenna feed may further include a higher frequency circular input located within the lower frequency coaxial input, a higher frequency input circular turnstile in communication with the higher frequency circular input and a higher frequency inner circular turnstile in communication with the higher frequency input circular turnstile. The embodiment of a dual-band antenna feed may further include a plurality of higher frequency polarizer phase shifting arms located in between the higher frequency input circular turnstile and the higher frequency inner circular turnstile and a higher frequency circular horn in communication with the higher frequency inner circular turnstile. The higher frequency circular horn may be located within the lower frequency outer coaxial horn.

Yet another embodiment of a dual-band antenna feed having an axis is disclosed. The embodiment of a dual-band antenna feed may include a lower frequency coaxial input, a lower frequency input coaxial turnstile in communication with the lower frequency coaxial input and a lower frequency outer coaxial turnstile in communication with the lower frequency input coaxial turnstile. The embodiment of a dual-band antenna feed may further include a plurality of lower frequency polarizer phase shifting arms located in between the lower frequency input turnstile and the lower frequency outer turnstile and a lower frequency outer coaxial horn in communication with the lower frequency outer coaxial turnstile. The embodiment of a dual-band antenna feed may further include a higher frequency circular input located within the lower frequency coaxial input, a higher frequency input circular turnstile in communication with the higher frequency circular input and a higher frequency inner coaxial turnstile in communication with the higher frequency input circular turnstile. The embodiment of a dual-band antenna feed may further include a plurality of higher frequency polarizer phase shifting arms located in between the higher frequency input circular turnstile and the higher frequency inner coaxial turnstile and a higher frequency coaxial horn in communication with the higher frequency inner coaxial turnstile and located within the lower frequency outer coaxial horn. According to another embodiment, the dual-band antenna feed may include a subreflector having a bottom surface directed toward the lower and the higher frequency horns, a plurality of axially dispersed strut subreflector supports, wherein each of the axially dispersed strut subreflector supports may be connected to the subreflector and the lower frequency outer coaxial horn and a coaxial subreflector support located within and extending from the higher frequency coaxial horn and connected to the subreflector.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A dual-band antenna feed having an axis, the feed comprising:

- a lower frequency coaxial input;
- a lower frequency input coaxial turnstile in communication with the lower frequency coaxial input;
- a lower frequency outer coaxial turnstile in communication with the lower frequency input coaxial turnstile;
- a lower frequency outer coaxial horn;
- a higher frequency circular input located within the lower frequency coaxial input;
- a higher frequency circular horn in communication with the higher frequency circular input and located within the lower frequency outer coaxial horn;
- a subreflector having a bottom surface directed toward the lower and the higher frequency horns; and
- a plurality of axially dispersed strut subreflector supports, each of the axially dispersed strut subreflector supports connected to the subreflector and the lower frequency outer coaxial horn.

2. The dual-band antenna feed according to claim 1, wherein the plurality of axially dispersed strut subreflector supports, comprise between one and six strut subreflector supports.

3. The dual-band antenna feed according to claim 1, wherein the plurality of axially dispersed strut subreflector supports, comprise four strut subreflector supports dispersed at 90° angles about the axis of the dual-band antenna feed.

4. The dual-band antenna feed according to claim 1, further comprising a plurality of lower frequency polarizer phase shifting arms located in between the lower frequency input turnstile and the lower frequency outer turnstile.

5. The dual-band antenna feed according to claim 4, wherein the plurality of lower frequency polarizer phase shifting arms are each oriented parallel to a longitudinal axis of the dual-band antenna feed.

6. The dual-band antenna feed according to claim 5, wherein the plurality of lower frequency polarizer phase shifting arms are each oriented at 90° intervals about the longitudinal axis of the dual-band antenna feed.

7. The dual-band antenna feed according to claim 1, further comprising:

- a higher frequency input circular turnstile in communication with the higher frequency circular input; and
- a higher frequency inner circular turnstile in communication with the higher frequency input circular turnstile.

8. The dual-band antenna feed according to claim 7, further comprising a plurality of higher frequency polarizer phase shifting arms located in between the higher frequency input circular turnstile and the higher frequency inner circular turnstile.

9. The dual-band antenna feed according to claim 8, wherein the plurality of higher frequency polarizer phase shifting arms are each oriented parallel to a longitudinal axis of the dual-band antenna feed.

10. The dual-band antenna feed according to claim 8, wherein the plurality of higher frequency polarizer phase shifting arms are each oriented at 90° intervals about the longitudinal axis of the dual-band antenna feed.

11. The dual-band antenna feed according to claim 1, fabricated as a single piece using metal additive manufacturing.

12. The dual-band antenna feed according to claim 1, fabricated without flanges or bolt holes between the interconnected inputs, turnstiles, horns, subreflector and supports, for assembling same together.

* * * * *